United States Patent
Kakui et al.

(10) Patent No.: US 7,336,415 B2
(45) Date of Patent: Feb. 26, 2008

(54) OPTICAL AMPLIFICATION MODULE, OPTICAL AMPLIFICATION APPARATUS, AND OPTICAL COMMUNICATIONS SYSTEM

(75) Inventors: Motoki Kakui, Yokohama (JP); Toshiyuki Miyamoto, Yokohama (JP); Masahiro Takagi, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 623 days.

(21) Appl. No.: 10/615,389

(22) Filed: Jul. 9, 2003

(65) Prior Publication Data
US 2004/0141229 A1  Jul. 22, 2004

(30) Foreign Application Priority Data
Jul. 10, 2002 (JP) ............... P2002-201827

(51) Int. Cl.
*H04B 10/17* (2006.01)
(52) U.S. Cl. ................. 359/337.1; 359/341.5
(58) Field of Classification Search ........... 359/341.1, 359/341.5, 342, 343, 337.1
See application file for complete search history.

(56) References Cited

U.S. PATENT DOCUMENTS

| | | | |
|---|---|---|---|
| 4,749,248 A * | 6/1988 | Aberson et al. ............. 385/37 |
| 6,501,596 B1 * | 12/2002 | Inoue et al. ............. 359/341.5 |
| 6,819,860 B2 * | 11/2004 | Ohara et al. ............. 385/142 |
| 2003/0081192 A1 * | 5/2003 | Nishi ............. 355/69 |
| 2004/0012844 A1 * | 1/2004 | Ohtsuki et al. ........... 359/341.1 |
| 2004/0141229 A1 * | 7/2004 | Kakui et al. ............. 359/342 |

FOREIGN PATENT DOCUMENTS

| | | |
|---|---|---|
| JP | 11-317561 | 11/1999 |
| JP | 2001-102661 | 4/2001 |
| JP | 2001-144358 | 5/2001 |
| JP | 2002-048935 | 2/2002 |
| JP | 2002-145636 | 5/2002 |

OTHER PUBLICATIONS

M. Asobe, H. Kobayashi, H. Itoh, and T. Kanamori, "Laser diode-driven ultrafst all-opticia switching by using highly non-linear chalcogenide glass fiber," Opt. Lett. 18, 1056-1058 (1993).*

(Continued)

*Primary Examiner*—Jack Keith
*Assistant Examiner*—Ari M Diacou
(74) *Attorney, Agent, or Firm*—McDermott Will & Emery LLP

(57) ABSTRACT

The present invention relates to a practical optical amplification module and the like realizing a wide-band gain spectrum with a small relative gain non-uniformity in L band. Pumping light from a pumping light source is supplied to a Bi type EDF by way of an optical coupler. Multiplexed signal light of L band inputted by way of an input end reaches the Bi type EDF by way of an optical coupler, an optical isolator, and an optical coupler, and is collectively amplified in the Bi type EDF. The multiplexed signal light amplified in the Bi type EDF is outputted from an output end by way of an optical coupler, an optical isolator, and an optical coupler.

78 Claims, 20 Drawing Sheets

OTHER PUBLICATIONS

N. Sugimoto, H. Kanbara, S. Fujiwara, K. Tanaka, and Y. Shimizugawa, "Third-order optical nonlinearities and their ultrafast response in Bi2O3-B2O3-SiO2 glasses," J. Opt. Soc. Am. B, 16, 1904-1908 (1999).*

"Fabrication of $Bl_2O_3$-based Er-doped waveguide for integrated optical amplifiers" OFC 2002, Tuesday Morining, pp. 11-12.

"Highly-nonlinear Bismuth Oxide-based glass fibers for all-optical signal processing" OFC 2002, Thurthday Afternoon, pp. 567-568.

"Broad-band 1.5 um emission of Er3+ ions in bismuth -based oxide glasses for potential WDM amplifier" S> Tanabe, et al., Journal of Luminescience 87-89 (2000), pp. 670-672.

Broadband 1.5um Emission of $Er^{2+}$Ions in Bismuth-based Oxide Glasses for WDM Amplifier' Naoki Sugimoto, LEOS 99, pp. 814-815.

"Fusion Spliceable and High Efficient $Bi_2O_3$-based EDF for Short-length and Broadband Application Pumped at 1480 nm." Yutaka Kuroiwa, OAA 2001, TUL5-1.

"Novel Short-length EDF for C+L Band Amplification" Naoki Sugimoto, et al., OAA 2000, PD3-1—PD 3-3.

"Gain-flattened, extended L-band (1570-1620 nm), high power, low noise erbium-doped fiber amplifiers", S Tanaka, et al., OFC 2002, Tech. Dig., ThJ3, pp. 459-461.

"Utra-Wideband L-band EDFA Using Phosphorus Co-Doped Silica-Fiber" OFC 2002, Tech. Dig., ThJ3, pp. 458.

"Optical Amplification over Extended I-band Employing Silica-Based P/A1 Codoped EDF", Kakui, et al., The 2002 IEICE General Conference C-3-28(with English Translation).

"Silica based erbium doped fiber extending the L-band 10 1620+ nm" IP. Byriel, et al., Ecoc 2001, Tu. L. 3.5, p. 232-233.

"Extending the L-band to 1620 nm Using MCS Fiber", A.J.E. Ellison, et al., TuA2-1-3, OFC2001.

"Broadband Amplification Characteristics of Tellurite-Based EDF As", A. Mori, et al, Tech. Dig., p. 135, ECOC 1997.

Japanese Office Action, with English translation, issued in Japanese Patent Application No. JP 2003-270708, mailed Oct. 30, 2007.

* cited by examiner

OPTICAL AMPLIFICATION MODULE, OPTICAL AMPLIFICATION APPARATUS, AND OPTICAL COMMUNICATIONS SYSTEM

BACKGROUND OF THE INVENTION

1. Field of the Invention

The present invention relates to an optical amplification module for amplifying signal light, an optical amplification apparatus, and an optical communications system including the optical amplification apparatus.

2. Related Background Art

Wavelength division multiplexing (WDM) optical communications systems are systems transmitting signal light (multiplexed signal light) in which a plurality of channels included in a predetermined signal wavelength band are multiplexed, thus making it possible to transmit/receive a large volume of information. For further increasing the amount of information which can be transmitted/received, using not only multiplexed signal light included in C band (1530 nm to 1565 nm) but also that included in L band (1565 nm to 1625 nm) has been under study.

Accordingly, optical amplification apparatus employed in optical communications systems are required to realize signal light amplification not only in C band but also in L band. Known as such an optical amplification apparatus is one (EDFA: Erbium Doped Fiber Amplifier) employing an optical fiber (EDF: Erbium Doped Fiber) made of silica-based host glass whose optical waveguide region is doped with Er element. In this optical amplification apparatus, pumping light having a wavelength (1.48 μm or 0.98 μm) capable of pumping Er element is fed to the EDF, which then amplifies signal light in C band or L band.

For example, an optical amplification apparatus disclosed in A. Mori, et al., ECOC 1997, Tech. Dig., p. 135 (literature 1) employs, as an optical amplification medium, a silica-based EDF codoped with Al, thereby yielding a flat gain up to a long wavelength of about 1600 nm. However, the flat wavelength band is too narrow for this optical amplification apparatus to collectively amplify the multiplexed signal light in L band. The above-mentioned literature 1 also proposes an optical amplification apparatus employing, as an optical amplification medium, an EDF made of tellurite-based host glass so as to attain a flat gain toward a longer wavelength side. However, this optical amplification apparatus may not be practical since tellurite glass incurs a fear of thermal damages.

An optical amplification apparatus disclosed in A. J. G. Ellison, et al., OFC 2001, TuA2 (literature 2) employs, as an optical amplification medium, a multicomponent silica-based EDF containing Sb element. However, this optical amplification apparatus may not be practical since Sb element is toxic.

Further, optical amplification apparatus which are practical as optical amplification apparatus media in that they incur no problems of thermal damages and toxicity have been proposed. For example, though the composition of a silica-based EDF disclosed in I. P. Byriel, et al., ECOC2001, Tu. L. 3.5 (literature 3) is unclear, silica-based EDFs disclosed in Kakui, et al., The 2002 IEICE General Conference C-3-28 (literature 4) and S. Tanaka, et al., OFC2002, Tech. Dig., ThJ3 (literature 5) are codoped with P element and Al element. The EDFs disclosed in literatures 3 to 5 attain a gain up to a long wavelength of about 1620 nm. However, their gain is remarkably low near a wavelength of 1580 nm, thus deteriorating a gain flatness which is important in WDM transmissions.

Here, the gain flatness of an EDF can be evaluated by a relative gain non-uniformity which will be explained with reference to FIG. 1. FIG. 1 is a typical gain spectrum for explaining the relative gain non-uniformity of an EDF. As shown in FIG. 1, the gain spectrum of an EDF roughly has two maximum gain values and one minimum gain value within a wavelength band exhibiting a gain. Let $G_{min}$ (dB) be the minimum gain value, and $\Delta G$ be the difference between the maximum gain value $G_{max}$ (dB) and the minimum gain value $G_{min}$ (dB). Let the ratio ($\Delta G/G_{min}$) of the difference $\Delta G$ to the minimum gain value $G_{min}$ (dB) represent the relative gain non-uniformity. The wavelength band yielding a gain not lower than the minimum gain value $G_{min}$ (dB) will be referred to as an effective signal wavelength region.

In terms of the gain flatness evaluation according to the relative gain non-uniformity defined in the foregoing, the EDFs disclosed in literatures 3 to 5 yield relative gain non-uniformities of about 25%, greater than 30%, and about 25%, respectively. If the relative gain non-uniformity of an EDF is too large, the insertion loss of optical filters inserted for gain equalization must increase, thereby deteriorating the pumping efficiency and noise figure.

For example, the gain of optical amplification apparatus required in main lines on the ground is about 30 dB. EDFs employed in such optical amplification apparatus are assumed to have a relative gain non-uniformity of 25%. In ground main line systems, an optical amplification apparatus incorporates therein a dispersion-compensating optical fiber in addition to an EDF in general, whereas the dispersion-compensating optical fiber typically exhibits a loss of about 10 dB. Also, other passive optical components (e.g., optical couplers and optical isolators) are inserted into the optical amplification apparatus, and yield an insertion loss of about 6 dB in total. Here, the gain to be realized by the EDF may become as high as 46 dB (=30 dB+10 dB+6 dB). Since the EDF has a relative gain non-uniformity of 25%, the peak insertion loss of optical filters inserted for gain equalization may be as high as 11.5 dB (=46 dB×0.25) at that time, which is on a par with the loss of the dispersion-compensating optical fiber. This may exert a large adverse effect on the pumping efficiency and noise figure.

Meanwhile, silica-based EDFs of C-band optical amplification apparatus which have already become widespread exhibit a relative gain non-uniformity on the order of 13% to 19% though depending on the kind and concentration of elements with which the EDFs are doped. FIG. 2 is a gain spectrum of an Al-codoped silica-based EDF. In FIG. 2, curves G2010, G2020, G2030, and G2040 show respective gain spectra with Al codopant concentrations of 1 wt %, 2.5 wt %, 3.5 wt %, and 5 wt %. As can be seen from FIG. 2, the relative gain non-uniformity of the EDF decreases as the Al codopant concentration is higher, and is on the order of 13% to 19%. Therefore, a value on this order becomes a target value for L-band optical amplification apparatus as well.

SUMMARY OF THE INVENTION

The inventors studied conventional optical amplification apparatus and, as a result, have found the following problems. Namely, the optical amplification apparatus disclosed in literature 1 employs, as an optical amplification medium, an EDF made of tellurite-based host glass which causes a fear of thermal damages, thus being unpractical. The optical amplification apparatus disclosed in literature 2 employs, as an optical amplification medium, a multicomponent silica-based EDF including toxic Sb element, and thus is also unpractical. Though each of the optical amplification apparatus disclosed in literatures 3 to 5 employs, as an optical amplification medium, a silica-based EDF which is practical in that it is free from the problems of thermal damages and toxicity, the EDF exhibits a large relative gain non-uniformity, thereby yielding a fear of exerting a large adverse effect on the pumping efficiency and noise figure.

For overcoming the problems mentioned above, it is an object of the present invention to provide a practical optical amplification module which realizes a wide-band gain spectrum with a small relative gain non-uniformity in L band, an optical amplification apparatus including the optical amplification module, and an optical communications system including the optical amplification apparatus and making it possible to transmit/receive a large volume of information.

The present invention provides an optical amplification module comprising a Bi type optical waveguide made of Bi oxide type host glass, and a pumping light supply system, in order to collectively amplify signal light (multiplexed signal light) having multiplexed a plurality of channels in a signal wavelength band including a wavelength region having a wavelength of 1610 nm or longer. The Bi type optical waveguide has an optical waveguide region, doped with Er element, for propagating the signal light. The pumping light supply system supplies pumping light having a predetermined wavelength to the Bi type optical waveguide so as to generate a population inversion within the optical waveguide region of the Bi type optical waveguide. The present invention provides an optical amplification apparatus including the optical amplification module having the structure mentioned above (the optical amplification module according to the present invention), and causes the optical amplification module to amplify the multiplexed signal light included in L band. The present invention provides an optical communications system comprising the optical amplification apparatus having the structure mentioned above (the optical amplification apparatus according to the present invention), transmits the multiplexed signal light included in L band, and causes the optical amplification apparatus to collectively amplify the multiplexed signal light.

In the optical amplification module according to the present invention, a population inversion occurs within the optical waveguide region of the Er-doped Bi type optical waveguide when pumping light is supplied thereto, whereby the multiplexed signal light (in which a plurality of channels within a signal wavelength band including a wavelength region having a wavelength of 1610 nm or longer are multiplexed) propagating through the optical waveguide region is amplified. Also, the multiplexed signal light included in L band is amplified in the optical amplification apparatus including such an optical amplification module. Further, an optical communications system including the optical amplification apparatus transmits the multiplexed signal light included in L band, which is amplified by the optical amplification apparatus. Thus, since the Er-doped Bi type optical waveguide is employed as an optical amplification medium, the present invention is practical in that it is free of the problems of thermal damages and toxicity, and can lower the relative gain non-uniformity over the wide effective signal wavelength region included in L band.

In the optical amplification module according to the present invention, the optical waveguide region of the Bi type optical waveguide doped with Er element may further be doped with B element. This is because of the fact that it improves the fluorescent characteristic on the longer wavelength side, thereby facilitating the construction of optical fiber networks utilizing glass fibers.

Preferably, the optical amplification module according to the present invention further comprises a control unit for regulating an optical power of pumping light supplied from the pumping light supply system to the Bi type optical waveguide. The control unit regulates the optical power of pumping light so as to yield a relative gain non-uniformity of less than 25%, more preferably less than 19%, in a net gain spectrum of the Bi type optical waveguide at all operating temperatures or a given operating temperature of the optical amplification module.

The control unit may regulate the optical power of the pumping light such that the Bi type optical waveguide exhibits a relative gain non-uniformity of less than 25% in a net gain spectrum in a wavelength bandwidth exceeding 37 nm, more preferably exceeding 50 nm, within the whole operating temperature range of the optical amplification module. Also, the control unit may regulate the optical power of the pumping light such that the Bi type optical waveguide exhibits a relative gain non-uniformity of less than 19% in a net gain spectrum in a wavelength bandwidth exceeding 37 nm, more preferably exceeding 50 nm, within the whole operating temperature range of the optical amplification module.

The optical amplification module according to the present invention may further comprise a temperature detecting device for detecting a temperature of the Bi type optical waveguide or nearby for feedback control of gain flatness, and preferably further comprises a temperature adjusting device for adjusting the temperature of the Bi type optical waveguide or nearby. In this case, the temperature of the Bi type optical waveguide whose gain heavily depends on temperature or nearby is detected by the temperature detecting device or regulated by the temperature adjusting device.

The present invention provides an optical amplification apparatus comprising the optical amplification module having the structure mentioned above (the optical amplification module according to the present invention) and a control unit.

In particular, according to an actual gain change amount ΔG (dB) in the optical amplification module, the control unit changes the temperature of the Bi type optical waveguide in the optical amplification module or nearby by ΔT (K). This makes it possible to maintain the gain flatness without additional optical components even if the actual gain must vary because of fluctuations in span loss and the like. For detecting gain fluctuations, the optical amplification apparatus according to the present invention may further comprise a power monitor for detecting an actual gain by monitoring at least one of input and output in the optical amplification apparatus. For detecting gain fluctuations, the optical amplification apparatus according to the present invention may further comprise an optical performance monitor for detecting a gain tilt by monitoring at least one of input and output in the optical amplification apparatus. For detecting gain fluctuations, an optical communications system including the optical amplification apparatus having such a structure may further comprise an upper monitor system.

For maintaining a gain flatness with a high accuracy of about ±1 dB, the control unit carries out the following control, for example. Namely, the control unit regulates the above-mentioned ΔT (K) so as to satisfy the following relationship:

$$(\Delta T \cdot G_{min}) \times 0.0036 - 1.2$$
$$\leq \Delta G \leq$$
$$(\Delta T \cdot G_{min}) \times 0.0036 + 1.2$$

where $G_{min}$ (dB) is the minimum value of actual gain within the signal wavelength band at 25° C. in the Bi type optical waveguide alone.

Preferably, for enabling faster gain flatness control, the control unit comprises a memory having stored therein data of ΔG (dB) and ΔT (K) actually measured during an actual operation of the optical amplification apparatus.

For feedback control of gain flatness, the control unit may change the temperature of the Bi type optical waveguide or nearby according to a gain tilt detected.

Specifically, the optical amplification apparatus according to the present invention may comprise the optical amplification module having the structure mentioned above (the optical amplification module according to the present invention), a light-losing component such as a variable attenuator, for example, and a control unit. The light-losing component is disposed on a transmission path of signal light, and exhibits a variable loss characteristic with respect to the signal light. The control unit orders the Bi type optical waveguide of the optical amplification module to be heated and cooled when the detected gain tilt in the optical amplification module is positive and negative, respectively.

For detecting the gain tilt without being influenced by level deviations between signal channels, the optical amplification apparatus may further comprise an optical performance monitor for detecting the gain tilt by receiving a part of signal light branched off from a signal path. In a simple method of gain tilt detection, the gain tilt may be detected by monitoring a signal level of at least one channel included in the signal light propagating through the Bi type optical waveguide. Also, an ASE level may be monitored at one or more wavelengths in the signal light wavelength band, so as to detect the gain tilt.

In the optical amplification apparatus including the optical amplification module having a variable optical attenuator, the control unit may determine an optical attenuation amount ΔA (dB) in the variable optical attenuator of the optical amplification module according to a detected temperature change ΔT (K) of the Bi type optical waveguide of the optical amplification module or nearby. In this case, a gain flatness can be maintained while saving the power consumption. Specifically, the control unit regulates the variable optical attenuator such that the optical attenuation amount ΔA (dB) in the variable optical attenuator is in proportion to the detected temperature change ΔT (K)

For maintaining a gain flatness at a high accuracy of ±1 dB, the control unit regulates the variable optical attenuator according to the temperature change ΔT (K) such that the optical attenuation amount ΔA (dB) in the variable optical attenuator satisfies the following relationship:

$$-0.0036 \cdot G_{min} \cdot \Delta T - 1.2$$
$$\leq \Delta A \leq$$
$$-0.0036 \cdot G_{min} \cdot \Delta T + 1.2$$

where $G_{min}$ (dB) is the minimum value of actual gain within the signal wavelength band at 25° C. in the Bi type optical waveguide alone in the optical amplification module.

Also, the control unit may regulate the variable optical attenuator according to the actual gain change amount ΔG (dB) in the optical amplification module and the temperature change ΔT (K) such that the optical attenuation amount ΔA (dB) in the variable optical attenuator satisfies the following relationship:

$$-0.0036 \cdot G_{min} \cdot \Delta T - \Delta G - 1.2$$
$$\leq \Delta A \leq$$
$$-0.0036 \cdot G_{min} \cdot \Delta T - \Delta G + 1.2$$

where $G_{min}$ (dB) is the minimum value of actual gain within the signal wavelength band at 25° C. in the Bi type optical waveguide alone in the optical amplification module.

For realizing faster control (without arithmetic operations) at a low power consumption, the control unit preferably comprises a memory having stored therein data of the actual gain change amount ΔG (dB) and temperature change ΔT (K) in the optical amplification module, and optical attenuation amount ΔA (dB) in the variable optical attenuator actually measured during an actual operation of the optical amplification module.

For enabling feedback control of gain flatness in the configuration mentioned above, the control unit may change the optical attenuation amount ΔA (dB) in the variable optical attenuator according to the detected gain tilt in the optical amplification module. Specifically, the control unit orders the optical attenuation amount ΔA (dB) of the variable optical attenuator to increase and decrease when the detected gain tilt in the optical amplification module is positive and negative, respectively.

Preferably, for detecting the gain tilt without being influenced by deviations between signal channels, the optical amplification apparatus further comprises an optical performance monitor for detecting the gain tilt by receiving a part of signal light branched off from the a signal path in this case as well. The gain tilt may also be detected by monitoring a signal level of at least one channel included in the signal light propagating through the Bi type optical waveguide, or an ASE level at one or more wavelengths in the signal wavelength band.

The optical amplification module according to the present invention may further comprise a light-losing component, disposed on a transmission path of multiplexed signal light, exhibiting a variable loss characteristic with respect to the multiplexed signal light. Specifically, it is preferred that the light-losing component include a variable optical attenuator. This makes it possible to attain a relative gain non-uniformity of 25% or less in terms of the net gain of the Bi type optical waveguide.

Preferably, the optical amplification module according to the present invention satisfies the following relationship:

$$\alpha_B \leq 0.021\alpha$$

where $\alpha_B$ (dB/m) is the background loss of the Bi type optical waveguide, and α (dB/m) is the absorption peak due to Er.

More preferably, the following relationship holds:

$$\alpha_B < 0.015\alpha$$

The former and latter cases make it possible to yield relative gain non-uniformitys of 25% or less and 19% or less in terms of the net gain of the Bi type optical waveguide, respectively.

Preferably, in the optical amplification module according to the present invention, the Bi type optical waveguide includes an optical fiber. This is because of the fact that it can elongate the waveguide length, thereby enhancing the gain.

Preferably, in the optical amplification module according to the present invention, the pumping light supply system includes a light source having a center output wavelength falling within the range from 1453 nm to 1473 nm at the highest output. More preferably, the pumping light supply system includes a light source always having a center output wavelength falling within the range from 1453 nm to 1473 nm. This is because of the fact that it is excellent in pumping efficiency of the Bi type optical waveguide.

More specifically, in the optical amplification module according to the present invention, the pumping light supply system comprises a semiconductor light-emitting device and a grating. The semiconductor light-emitting device includes a light-reflecting surface and a light-emitting surface opposing the light-reflecting surface. The grating functions to reflect a part of light having a specific wavelength in light emitted from the light-emitting surface of the semiconductor light-emitting device, and make thus emitted light incident on the inside of the semiconductor light-emitting device from the light-emitting surface. For example, an optical fiber grating formed within an optical fiber is suitable as this grating. This is because of the fact that it can stabilize the wavelength of pumping light supplied from the pumping light supply system.

Preferably, the optical member according to the present invention further comprises a silica-based optical waveguide made of silica-based host glass. This silica-based optical waveguide includes an optical waveguide region doped with Er element. This improves the pumping efficiency or noise figure. The noise figure is improved if the silica-based optical waveguide is disposed on the upstream side of the Bi type optical waveguide as seen in a traveling direction of multiplexed signal light. The pumping efficiency is improved if the silica-based optical waveguide is disposed on the downstream side of the Bi type optical waveguide as seen in the traveling direction of multiplexed signal light. Preferably, the silica-based optical waveguide is codoped with P element and at least one of trivalent ions such as $Al^{3+}$, $La^{3+}$ and so on. This expands the gain band in L band.

The optical amplification apparatus and optical communications system according to the present invention may further comprise a Raman amplification optical fiber disposed on a transmission path of the multiplexed signal light on the upstream side of the Bi type optical waveguide as seen in a traveling direction of the multiplexed signal light. In this case, a distribution type Raman amplifier is realized when at least one of pumping light having a wavelength of about 1470 nm and pumping light having a wavelength of 1520 nm or more is supplied to the Raman amplification optical fiber.

DETAILED DESCRIPTION OF THE PREFERRED EMBODIMENTS

In the following, embodiments of the optical amplification module and the like according to the present invention will be explained in detail with reference to FIGS. 3 to 6, 7A, 7B, 8 to 18, and 19A to 20B. In the explanation of the drawings, constituents identical to each other will be referred to with numerals identical to each other without repeating their overlapping descriptions.

Figure 1:
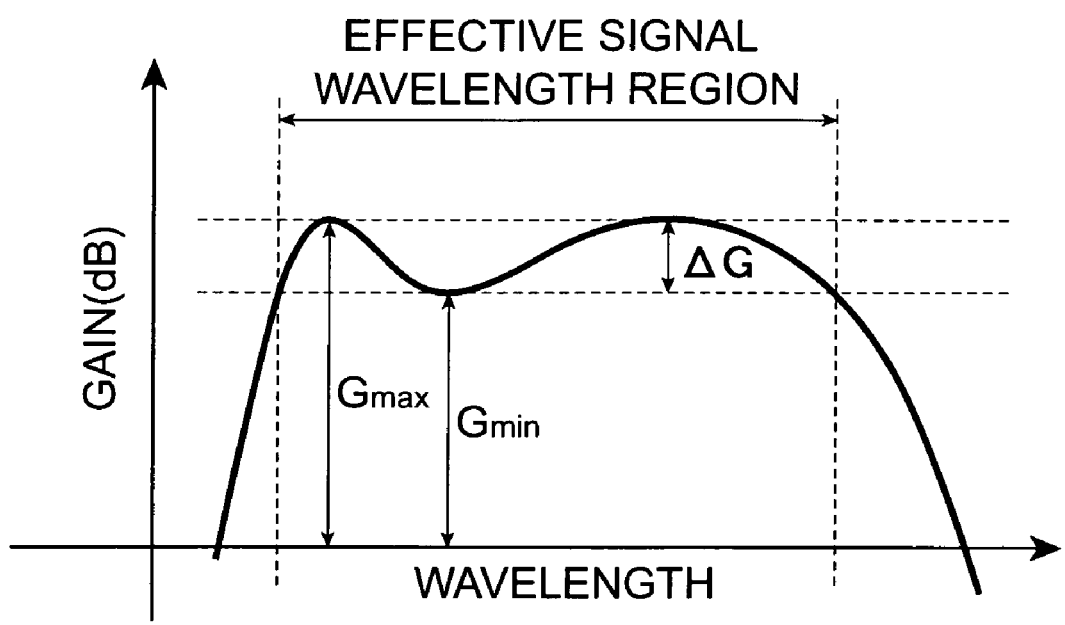
FIG. 1 is a typical gain spectrum prepared for explaining a relative gain non-uniformity of an EDF.
Figure 2:
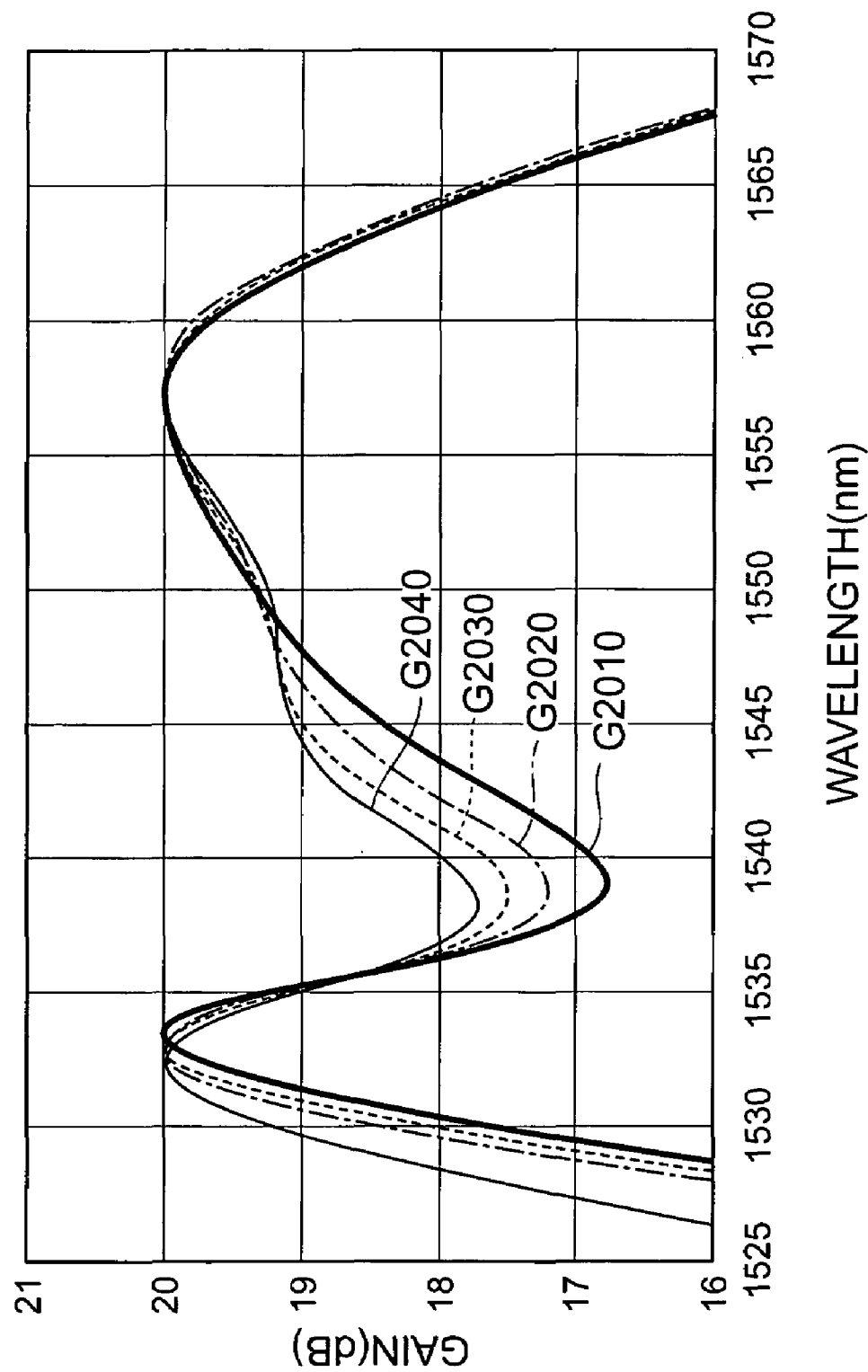
FIG. 2 is a graph showing gain spectra of Al-codoped silica-based EDFs.
Figure 3:
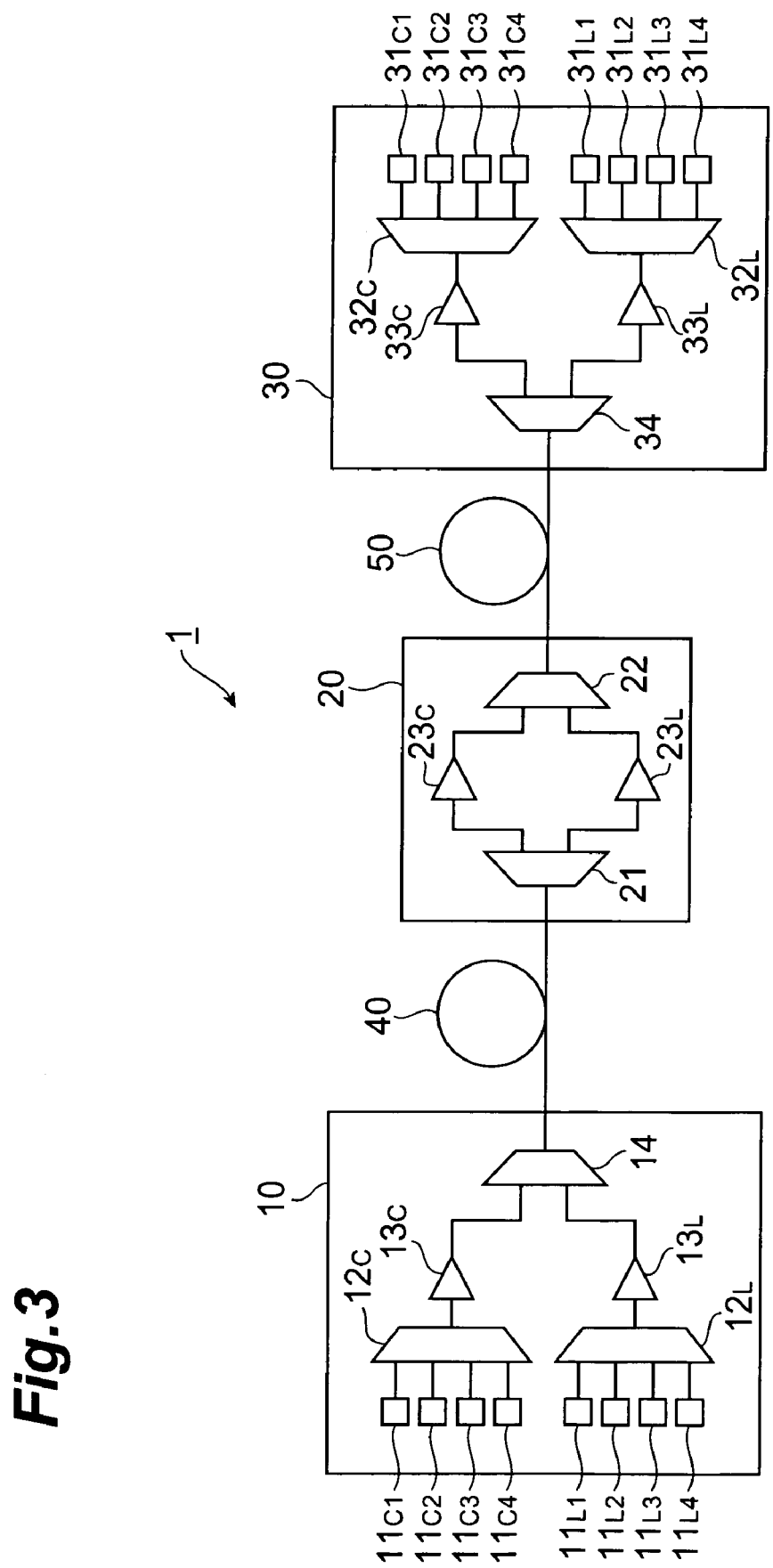
FIG. 3 is a diagram showing the configuration of a first embodiment of the optical communications system according to the present invention.

FIG. 3 is a diagram showing the configuration of a first embodiment of the optical communications system according to the present invention. The optical communications system 1 shown in this diagram comprises an optical transmitting station 10, an optical repeating station 20, an optical receiving station 30, and optical fiber transmission lines 40, 50. The optical fiber transmission line 40 is laid between the optical transmitting station 10 and the optical repeating station 20, whereas the optical fiber transmission line 50 is laid between the optical repeating station 20 and the optical receiving station 30.

The optical transmitting station 10 comprises light source units $11_{C1}$ to $11_{C4}$, light source units $11_{L1}$ to $11_{L4}$, an optical multiplexer $12_C$, an optical multiplexer $12_L$, an optical amplification apparatus $13_C$, an optical amplification apparatus $13_L$, and an optical multiplexer 14. The light source units $11_{C1}$ to $11_{C4}$ output signal light in which a plurality of channels of wavelengths different from each other included in C band are multiplexed. The optical multiplexer $12_C$ inputs therein the respective signal channels of light in C band outputted from the light source units $11_{C1}$ to $11_{C4}$, and combines them. The optical amplification apparatus $13_C$ inputs therein the multiplexed signal light of C band combined by the optical multiplexer $12_C$, and collectively amplifies this signal light. The light source units $11_{L1}$ to $11_{L4}$ output signal light in which a plurality of channels of wavelengths different from each other included in L band are multiplexed. The optical multiplexer $12_L$ inputs therein the respective signal channels of light in L band outputted from the light source units $11_{L1}$ to $11_{L4}$, and combines them. The optical amplification apparatus $13_L$ inputs therein the multiplexed signal light of L band combined by the optical multiplexer $12_L$, and collectively amplifies this signal light. The optical multiplexer 14 inputs therein the multiplexed signal light of C band outputted from the optical amplification apparatus $13_C$ and the multiplexed signal light of L band outputted from the optical amplification apparatus $13_L$, and combines them. The multiplexed signal light combined by the optical multiplexer 14 is sent to the optical fiber transmission line 40.

The optical repeating station 20 comprises an optical demultiplexer 21, an optical multiplexer 22, an optical amplification apparatus $23_C$, and an optical amplification apparatus $23_L$. The optical demultiplexer 21 inputs therein the multiplexed signal light having arrived by way of the optical fiber transmission line 40, and divides it into C and L bands. The multiplexed signal light divided into C band is guided to the optical amplification apparatus $23_C$, whereas the multiplexed signal light divided into L band is outputted to the optical amplification apparatus $23_L$. The optical amplification apparatus $23_C$ inputs therein the multiplexed signal light of C band outputted from the optical demultiplexer 21, and collectively amplifies it. The optical amplification apparatus $23_L$ inputs therein the multiplexed signal light of L band outputted from the optical demultiplexer 21, and collectively amplifies it. The optical multiplexer 22 inputs therein the multiplexed signal light of C band outputted from the optical amplification apparatus $23_C$ and the multiplexed signal light of L band outputted from the optical amplification apparatus $23_L$, and combines them. Thus combined signal light is sent to the optical fiber transmission line 50.

The optical receiving station 30 comprises light-receiving units $31_{C1}$ to $31_{C4}$, light-receiving units $31_{L1}$ to $31_{L4}$, an optical demultiplexer $32_C$, an optical demultiplexer $32_L$, an optical amplification apparatus $33_C$, an optical amplification apparatus $33_L$, and an optical demultiplexer 34. The optical demultiplexer 34 inputs therein the multiplexed signal light having arrived by way of the optical fiber transmission line 50, and divides it into C and L bands. Also, the optical demultiplexer 34 outputs the multiplexed signal light of C band to the optical amplification apparatus $33_C$, and the multiplexed signal light of L band to the optical amplification apparatus $33_L$. The optical amplification apparatus $33_C$ inputs therein the multiplexed signal light of C band outputted from the optical demultiplexer 34, collectively amplifies this signal light, and outputs thus amplified signal light. The optical demultiplexer $32_C$ inputs therein the multiplexed signal light of C band outputted from the optical amplification apparatus $33_C$, and divides this signal light into individual channels. The light-receiving units $31_{C1}$ to $31_{C4}$ receive respective wavelengths of signal light of C band outputted from the optical demultiplexer $32_C$ after being divided thereby. The optical amplification apparatus $33_L$ inputs therein the multiplexed signal light of L band outputted from the optical demultiplexer 34, collectively amplifies this signal light, and outputs thus amplified signal light. The optical demultiplexer $32_L$ inputs therein the multiplexed signal light of L band outputted from the optical amplification apparatus $33_L$, and divides this signal light into individual channels. The light-receiving units $31_{L1}$ to $31_{L4}$ receive a plurality of channels of signal light included in L band divided by the optical demultiplexer $32_L$, and convert them into electric signals.

In the optical communications system 1, the multiplexed signal light components outputted from the light source units $11_{C1}$ to $11_{C4}$ are combined by the optical multiplexer $12_C$ within the optical transmitting station 10. Thus combined signal light is collectively amplified by the optical amplification apparatus $13_{C1}$. The amplified signal light is sent to the optical fiber transmission line 40 by way of the optical multiplexer 14. The multiplexed signal light of C band propagated through the optical fiber transmission line 40 is collectively amplified by the optical amplification apparatus $23_C$ by way of the optical demultiplexer 21 within the optical repeating station 20. Thus amplified signal light is sent to the optical fiber transmission line 50 by way of the optical multiplexer 22. The multiplexed signal light of C band propagated through the optical fiber transmission line 50 is collectively amplified by the optical amplification apparatus $33_C$ by way of the optical demultiplexer 34 within the optical receiving station 30. Thus amplified signal light is divided by the optical demultiplexer $32_C$ into individual signal channels, which are then received by the light-receiving units $31_{C1}$ to $31_{C4}$.

On the other hand, the multiplexed signal light components outputted from the light source units $11_{L1}$ to $11_{L4}$ are combined by the optical multiplexer $12_L$ within the optical transmitting station 10. Thus combined signal light is collectively amplified by the optical amplification apparatus $13_L$. The amplified signal light is sent to the optical fiber transmission line 40 by way of the optical multiplexer 14. The multiplexed signal light of L band propagated through the optical fiber transmission line 40 is collectively amplified by the optical amplification apparatus $23_L$ by way of the optical demultiplexer 21 within the optical repeating station 20. Thus amplified signal light is sent to the optical fiber transmission line 50 by way of the optical multiplexer 22. The multiplexed signal light of L band propagated through the optical fiber transmission line 50 is collectively amplified by the optical amplification apparatus $33_L$ by way of the optical demultiplexer 34 within the optical receiving station 30. Thus amplified signal light is divided by the optical demultiplexer $32_L$ into individual signal channels, which are then received by the light-receiving units $31_{L1}$ to $31_{L4}$.

Figure 4:
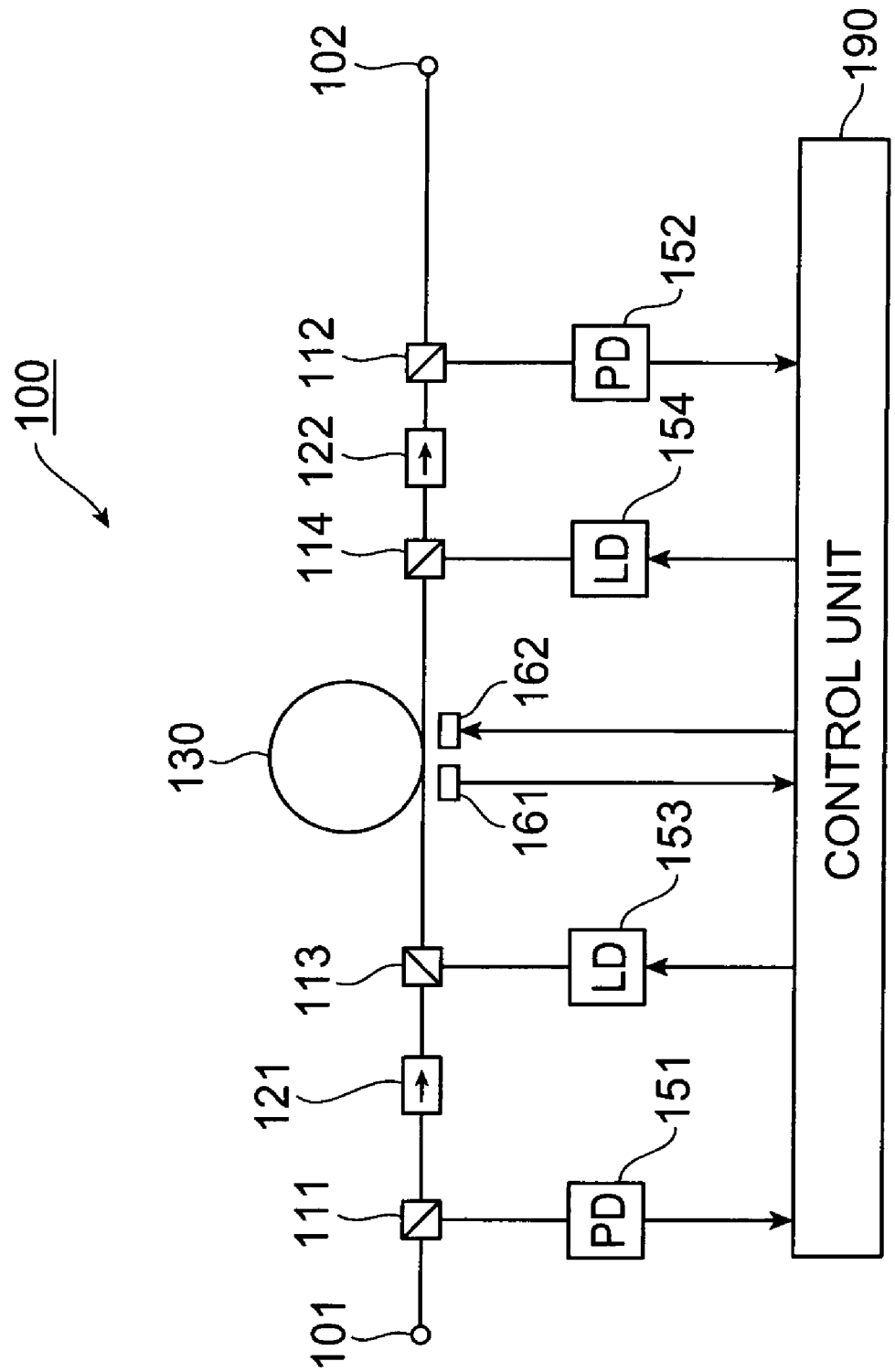
FIG. 4 is a diagram showing the configuration of a first embodiment of the optical amplification apparatus according to the present invention.

FIG. 4 is a diagram showing the configuration of a first embodiment of the optical amplification apparatus according to the present invention. The optical amplification apparatus 100 shown in this drawing is suitable for the optical amplification apparatus $13_L$ included in the optical communications system 1 shown in FIG. 3. The optical amplification apparatus 100 comprises, successively from its input end 101 to output end 102, an optical coupler 111, an optical isolator 121, an optical coupler 113, a Bi type EDF 130, an optical coupler 114, an optical isolator 123, and an optical coupler 112. The optical amplification apparatus 100 also comprises a light-receiving device 151 connected to the optical coupler 111, a light-receiving device 152 connected to the optical coupler 112, a pumping light source 153 connected to the optical coupler 113, a pumping light source 154 connected to the optical coupler 114, a temperature detecting device 161 and a temperature adjusting device 162 which are disposed in contact with or in the vicinity of the Bi type EDF 130, and a control unit 190 for regulating operations of the optical amplification apparatus 100 as a whole.

The optical coupler 111 branches out a part of the multiplexed signal light fed therein by way of the input end 101, outputs thus branched part to the light-receiving device 151, and outputs the remaining part to the optical isolator 121. The optical coupler 112 branches out a part of the multiplexed signal light having arrived from the optical isolator 122, and outputs thus branched part to the light-receiving device 152. The light-receiving devices 151, 152 receive the parts of multiplexed signal light having arrived there, and output electric signals having values corresponding to respective optical powers of thus received parts to the control unit 190.

To the Bi type EDF 130, the optical coupler 113 outputs the multiplexed signal light having arrived from the optical isolator 121, and the pumping light outputted from the pumping light source 153. The optical coupler 114 outputs to the optical isolator 122 the multiplexed signal light having arrived from the Bi type EDF 130, and outputs to the Bi type EDF 130 the pumping light outputted from the pumping light source 154. The optical couplers 113, 114 and the pumping light sources 153, 154 constitute a pumping light supply system for supplying the pumping light to the Bi type EDF 130.

Each of the pumping light sources 153, 154 is an optical device for outputting the pumping light for pumping Er element with which the Bi type EDF 130 is doped. For example, a semiconductor laser light source is suitable therefor. Each of the pumping light sources 153, 154 preferably has a center output wavelength falling within the range from 1453 nm to 1473 nm at the highest output. More preferably, the center output wavelength always falls within the range from 1453 nm to 1473 nm. Utilizing the pumping light having such a wavelength improves the signal amplification efficiency in the Bi type EDF 130.

Each of the pumping light sources 153, 154 includes a laser diode having a light-reflecting surface and a light-emitting surface opposing the light-reflecting surface; and a grating for reflecting a part of light having a specific wavelength in the light emitted from the light-emitting surface of the laser diode so as to make this part incident on the inside of the laser diode from the light-emitting surface. An optical fiber grating formed on an optical fiber is suitable for this grating. Each of thus configured pumping light sources 153, 154 stabilizes its output wavelength.

Each of the optical isolators 121, 122 is an optical device which transmits light therethrough in the forward direction from the input end 101 to the output end 102, but not in the opposite direction.

The Bi type EDF 130 is an optical fiber made of Bi oxide type host glass having an optical waveguide region doped with Er element. The Bi type EDF 130 may not only be an optical fiber but also a planar optical waveguide. Since a large unsaturated absorption is necessary for L band, however, optical fibers, which are easy to secure a waveguide length, are preferred. Within the optical waveguide region of the Bi type EDF 130, a population inversion occurs when pumping light outputted from the pumping light sources 153, 154 is supplied, whereby signal light having multiplexed a plurality of channels in the signal wavelength band including a wavelength region having a wavelength of 1610 nm or longer is collectively amplified.

The temperature detecting device 161 is disposed in contact with or in the vicinity of the Bi type EDF 130, and detects the temperature of the Bi type EDF 130 or nearby. For example, a thermistor is suitable therefor. The temperature adjusting device 162 is disposed in contact with or in the vicinity of the Bi type EDF 130, and adjusts the temperature of the Bi type EDF 130 or nearby. For example, a Peltier device or heater is suitable therefor.

The control unit 190 regulates operations of the optical amplification apparatus 100 as a whole. The control unit 190 inputs therein respective electric signals outputted from the light-receiving devices 151, 152, detects the optical power of signal light fed into the Bi type EDF 130, and detects the optical power of signal light outputted from the Bi type EDF 130. Also, according to the input signal power and output signal power, the control unit 190 determines the amplification gain in the Bi type EDF 130. The control unit 190 acquires the temperature of the Bi type EDF 130 or nearby detected by the temperature detecting device 161. According to thus detected information, the control unit 190 regulates the optical powers of pumping light components outputted from the pumping light sources 153, 154, and controls the temperature adjusting device 162 regulating the temperature of the Bi type EDF 130 or nearby.

The optical amplification apparatus 100 roughly operates as follows: The pumping light components outputted from the pumping light sources 153, 154 are supplied to the Bi type EDF 130 by way of the optical couplers 113, 114, respectively. The multiplexed signal light of L band inputted by way of the input end 101 reaches the Bi type EDF 130 by way of the optical coupler 111, optical isolator 121, and optical coupler 113, and is optically amplified by the Bi type EDF 130 in a collective fashion. The multiplexed signal light amplified by the Bi type EDF 130 is outputted from the output end 102 by way of the optical coupler 114, optical isolator 123, and optical coupler 112.

The signal amplifying operation in the Bi type EDF 130 included in the optical amplification apparatus 100 is carried out as follows: Namely, the optical power of pumping light supplied from the pumping light supply system to the Bi type EDF 130 is adjusted such that the net gain spectrum in the Bi type EDF 130 exhibits a relative gain non-uniformity of less than 25%, preferably less than 19%, a tone of operating temperatures of the optical amplification apparatus 100.

Also, the optical power of pumping light supplied from the pumping light supply system to the Bi type EDF 130 may be adjusted such that the net gain spectrum in the Bi type EDF 130 exhibits a relative gain non-uniformity of less than 25%, preferably less than 19%, within the whole operating temperature range of the optical amplification apparatus 100.

The optical power of pumping light supplied from the pumping light supply system to the Bi type EDF 130 may be adjusted such that the net gain spectrum in the Bi type EDF 130 exhibits a relative gain non-uniformity of less than 25% in a wavelength bandwidth exceeding 37 nm, preferably exceeding 50 nm, within the whole operating temperature range of the optical amplification apparatus 100.

Also, the optical power of pumping light supplied from the pumping light supply system to the Bi type EDF 130 may be adjusted such that the net gain spectrum in the Bi type EDF 130 exhibits a relative gain non-uniformity of less than 19% in a wavelength bandwidth exceeding 37 nm, preferably exceeding 50 nm, within the whole operating temperature range of the optical amplification apparatus 100.

Figure 5:
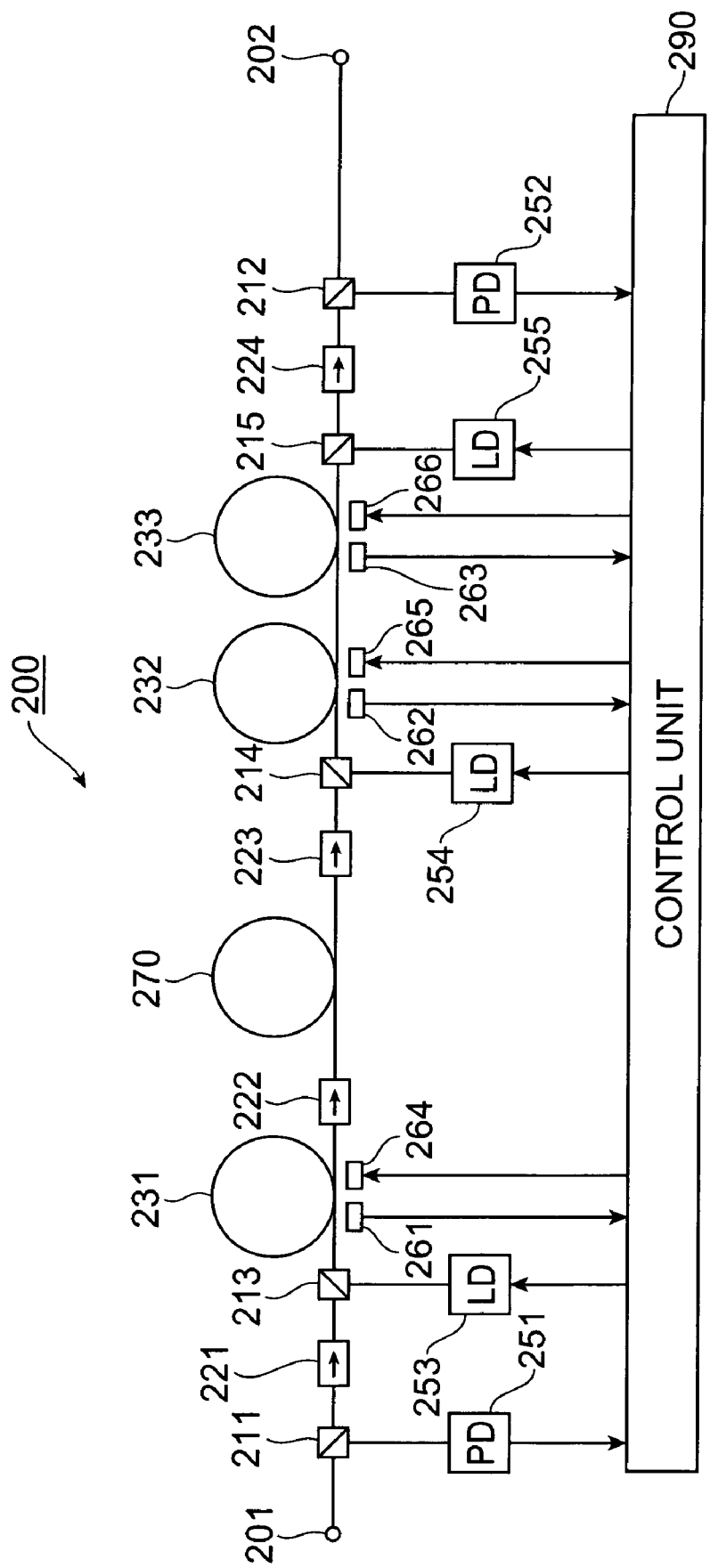
FIG. 5 is a diagram showing the configuration of a second embodiment of the optical amplification apparatus according to the present invention.

FIG. 5 is a diagram showing the configuration of a second embodiment of the optical amplification apparatus according to the present invention. The optical amplification apparatus 200 shown in this diagram is suitable for the optical amplification apparatus $23_L$, $33_L$ included in the optical communications system 1 shown in FIG. 3. The optical amplification apparatus 200 comprises, successively from its input end 201 to output end 202, an optical coupler 211, an optical isolator 221, an optical coupler 213, a Bi type EDF 231, an optical isolator 222, a dispersion-compensating optical fiber 270, an optical isolator 223, an optical coupler 214, a Bi type EDF 232, a silica-based EDF 233, an optical coupler 215, an optical isolator 224, and an optical coupler 212. The optical amplification apparatus 200 also comprises a light-receiving device 251 connected to the optical coupler 211, a light-receiving device 252 connected to the optical coupler 212, a pumping light source 253 connected to the optical coupler 213, a pumping light source 254 connected to the optical coupler 214, a pumping light source 255 connected to the optical coupler 215, a temperature detecting device 261 and a temperature adjusting device 264 which are disposed in contact with or in the vicinity of the Bi type EDF 231, a temperature detecting device 262 and a temperature adjusting device 265 which are disposed in contact with or in the vicinity of the Bi type EDF 232, a temperature detecting device 263 and a temperature adjusting device 266 which are disposed in contact with or in the vicinity of the silica-based EDF 233, and a control unit 290 for regulating operations of the optical amplification apparatus 200 as a whole.

The optical coupler 211 branches out a part of the multiplexed signal light fed therein by way of the input end 201, outputs thus branched part to the light-receiving device 251, and outputs the remaining part to the optical isolator 221. The optical coupler 212 branches out a part of the multiplexed signal light having arrived from the optical isolator 224, and outputs thus branched part to the light-receiving device 252. The light-receiving devices 251, 252 receive the parts of multiplexed signal light having arrived there, and output electric signals having values corresponding to respective optical powers of thus received parts to the control unit 290.

To the Bi type EDF 231, the optical coupler 213 outputs the multiplexed signal light having arrived from the optical isolator 221 and the pumping light outputted from the pumping light source 253. To the Bi type EDF 232, the optical coupler 214 outputs the multiplexed signal light having arrived from the optical isolator 223 and the pumping light outputted from the pumping light source 254. The optical coupler 215 outputs to the optical isolator 224 the multiplexed signal light having arrived from the silica-based EDF 233, and outputs to the silica-based EDF 233 the pumping light outputted from the pumping light source 255. The optical coupler 213 and pumping light source 253 constitute a part of a pumping light supply system for supplying the pumping light to the Bi type EDF 231. The optical couplers 214, 215 and the pumping light sources 254, 255 constitute a part of a pumping light supply system for supplying the pumping light to the Bi type EDF 232 and silica-based EDF 233.

Each of the pumping light sources 253 to 255 is an optical device for outputting the pumping light for pumping Er element with which the Bi type EDFs 231, 232 or silica-based EDF 233 is doped. For example, a semiconductor laser light source is suitable therefor. Each of the pumping light sources 253, 254 preferably has a center output wavelength falling within the range from 1453 nm to 1473 nm at the highest output. More preferably, the center output wavelength always falls within the range from 1453 nm to 1473 nm. Utilizing the pumping light having such a wavelength improves the signal amplification efficiency in the Bi type EDFs 231, 232.

Each of the pumping light sources 253 to 255 includes a laser diode having a light-reflecting surface and a light-emitting surface opposing the light-reflecting surface; and a grating for reflecting a part of light having a specific wavelength in the light emitted from the light-emitting surface of the laser diode so as to make this part incident on the inside of the laser diode from the light-emitting surface. An optical fiber grating formed on an optical fiber is suitable for this grating. Each of thus configured pumping light sources 253 to 255 stabilizes its output wavelength.

Each of the optical isolators 221 to 224 is an optical device which transmits light therethrough in the forward direction from the input end 201 to the output end 202, but not in the opposite direction.

Each of the Bi type EDFs 231, 232 is an optical fiber made of Bi oxide type host glass having an optical waveguide region doped with Er element. Within the optical waveguide regions of the Bi type EDFs 231, 232, a population inversion occurs when pumping light outputted from the pumping light sources 253, 254 is supplied, whereby signal light having multiplexed a plurality of channels in the signal wavelength band including a wavelength region having a wavelength of 1610 nm or longer is collectively amplified.

The silica-based EDF 233 is an optical fiber made of silica-based host glass having an optical waveguide region doped with Er element. Within the optical waveguide region of the silica-based EDF 233, a population inversion occurs when pumping light outputted from the pumping light source 255 is supplied, whereby the multiplexed signal light is collectively amplified. Preferably, as shown in FIG. 5, the silica-based EDF 233 is disposed on the downstream side of the Bi type EDF 233 as seen in the traveling direction of multiplexed signal light, whereby an excellent pumping efficiency is obtained. It will also be preferred if the silica-based EDF 233 is disposed on the upstream side of the Bi type EDF 232, whereby an excellent noise figure is obtained. Preferably, the silica-based EDF 232 is codoped with P element and at least one of trivalent ions such as $Al^{3+}$, $La^{3+}$, and so on.

The temperature detecting device 261 is disposed in contact with or in the vicinity of the Bi type EDF 231, and detects the temperature of the Bi type EDF 231 or nearby. The temperature detecting device 262 is disposed in contact with or in the vicinity of the Bi type EDF 232, and detects the temperature of the Bi type EDF 232 or nearby. The temperature detecting device 263 is disposed in contact with or in the vicinity of the silica-based EDF 233, and detects the temperature of the silica-based EDF 233 or nearby. For each of the temperature detecting devices 261 to 263, a thermistor is suitable, for example.

The temperature adjusting device 264 is disposed in contact with or in the vicinity of the Bi type EDF 231, and adjusts the temperature of the Bi type EDF 231 or nearby. The temperature adjusting device 265 is disposed in contact with or in the vicinity of the Bi type EDF 232, and adjusts the temperature of the Bi type EDF 232 or nearby. The temperature adjusting device 266 is disposed in contact with or in the vicinity of the silica-based EDF 233, and adjusts the temperature of the silica-based EDF 233 or nearby. For each of the temperature adjusting devices 264 to 266, a Peltier device or heater is suitable, for example.

The dispersion-compensating optical fiber 270 has a negative chromatic dispersion in the signal light wavelength band, thereby compensating for the positive chromatic dispersion in the optical fiber transmission line 40 or 50.

The control unit 290 regulates operations of the optical amplification apparatus 200 as a whole. The control unit 290 inputs therein respective electric signals outputted from the light-receiving devices 251, 252, detects the optical power of the signal light fed into the Bi type EDF 231, detects the optical power of the signal light outputted from the silica-based EDF 233, and determines signal light amplification gains in the Bi type EDFs 231, 232 and silica-based EDF 233 according to the input and output signal light powers. Also, the control unit 290 acquires the temperature of the Bi type EDF 231 or nearby detected by the temperature detecting device 261, the temperature of the Bi type EDF 232 or nearby detected by the temperature detecting device 262, and the temperature of the silica-based EDF 233 or nearby detected by the temperature detecting device 263. According to thus detected information, the control unit 290 regulates respective optical powers of pumping light components outputted from the pumping light sources 253, 254, and controls the temperature adjusting device 264 regulating the temperature of the Bi type EDF 231 or nearby, the temperature adjusting device 265 regulating the temperature of the Bi type EDF 232 or nearby, and the temperature adjusting device 266 regulating the temperature of the silica-based EDF 233 or nearby.

The optical amplification apparatus 200 roughly operates as follows: The pumping light components outputted from the pumping light sources 253 to 255 are supplied to the Bi type EDFs 231, 232 and silica-based EDF 233 byway of the optical couplers 213 to 215, respectively. The multiplexed signal light of L band inputted by way of the input end 201 is fed into the Bi type EDF 231 by way of the optical coupler 211, optical isolator 221, and optical coupler 213, and is collectively amplified by the Bi type EDF 231. The multiplexed signal light amplified by the Bi type EDF 231 is fed into the dispersion-compensating optical fiber 270 by way of the optical isolator 222, and its dispersion is compensated for by the dispersion-compensating optical fiber 270. The multiplexed signal light having the dispersion compensated for by the dispersion-compensating optical fiber 270 is successively fed into the Bi type EDF 232 and silica-based EDF 233 byway of the optical isolator 223 and optical coupler 214, and is collectively amplified by the Bi type EDF 232 and silica-based EDF 233. Thus optically amplified multiplexed signal light is outputted from the output end 202 by way of the optical coupler 215, optical isolator 224, and optical coupler 212.

The signal amplifying operation in the Bi type EDFs 231, 232 included in the optical amplification apparatus 200 is carried out as follows: Namely, the optical powers of pumping light components supplied from the pumping light supply systems to the Bi type EDFs 231, 232 are adjusted such that the net gain spectrum in the Bi type EDFs 231, 232 exhibits a relative gain non-uniformity of less than 25%, preferably less than 19%, at one of operating temperatures of the optical amplification apparatus 200.

Also, the optical powers of pumping light supplied from the pumping light supply system to the Bi type EDFs 231, 232 may be adjusted such that the net gain spectrum in the Bi type EDFs 231, 232 exhibits a relative gain non-uniformity of less than 25%, preferably less than 19%, within the whole operating temperature range of the optical amplification apparatus 200.

The optical powers of pumping light components supplied from the pumping light supply systems to the Bi type EDFs 231, 232 may be adjusted such that the net gain spectrum in the Bi type EDFs 231, 232 exhibits a relative gain non-uniformity of less than 25% in a wavelength bandwidth exceeding 37 nm, preferably exceeding 50 nm, within the whole operating temperature range of the optical amplification apparatus 200.

The optical powers of pumping light components supplied from the pumping light supply systems to the Bi type EDFs 231, 232 may be adjusted such that the net gain spectrum in the Bi type EDFs 231, 232 exhibits a relative gain non-uniformity of less than 19% in a wavelength bandwidth exceeding 37 nm, preferably exceeding 50 nm, within the whole operating temperature range of the optical amplification apparatus 200.

The Bi type EDFs 130, 231, and 232 included in the optical amplification apparatus 100, 200 will now be explained in further details.

Figure 6:
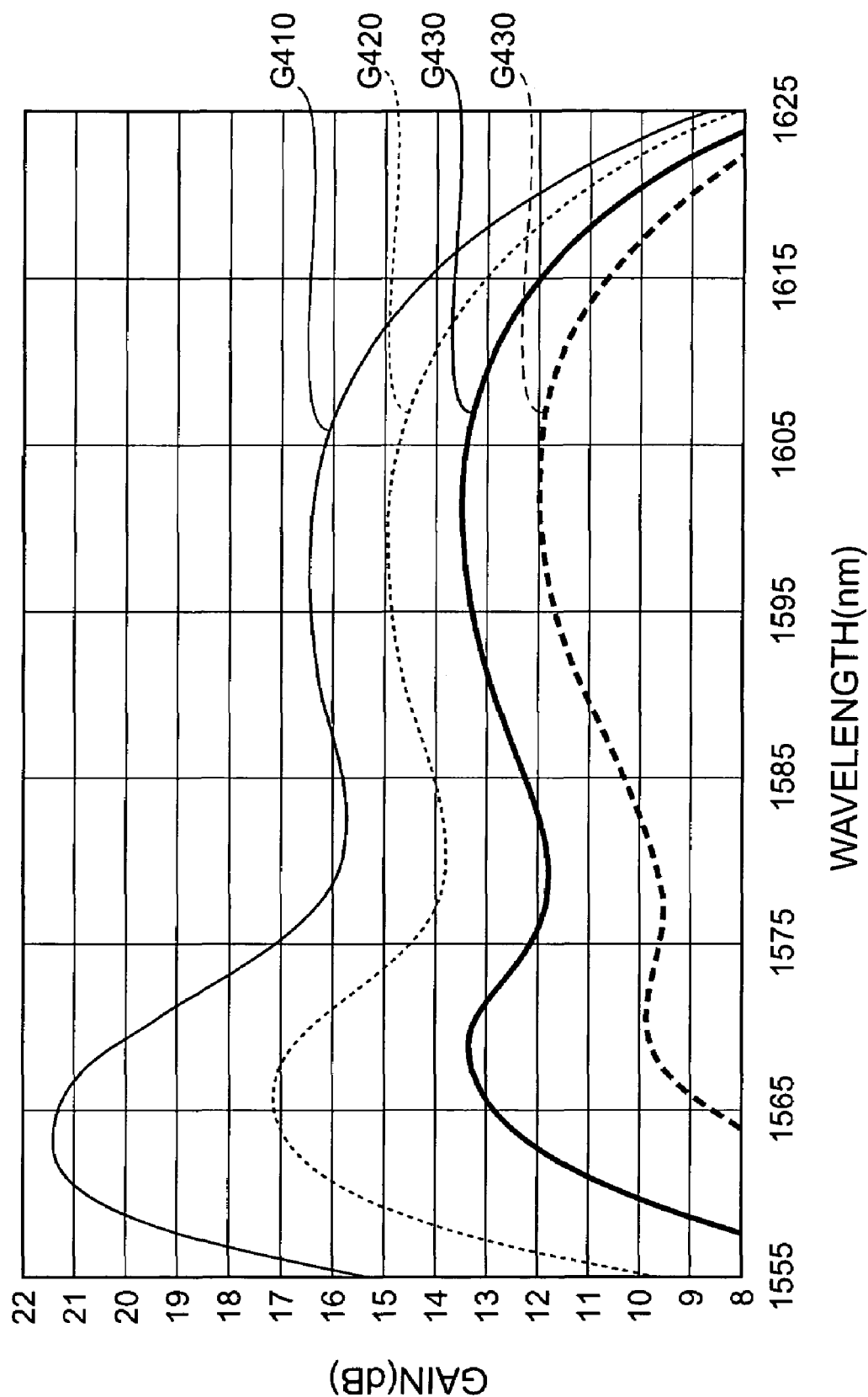
FIG. 6 is a graph showing gain spectra of a Bi type EDF.

FIG. 6 shows gain spectra of a Bi type EDF. The prepared Bi type EDF had an unsaturated absorption peak of about 300 dB due to Er element, a length of about 2 m, and a background loss of about 1.6 dB including a fusion splice loss with a silica-based optical fiber. Employed as an evaluation method was a pump/probe method in which the multiplexed signal light to be amplified was simulated by a main signal of a small number of channels. The total input signal light had an optical power of 0 dBm, whereas pumping light in the 1.48-μm wavelength band was bidirectionally supplied to the Bi type EDF.

FIG. 6 shows respective gain spectra in four kinds of population inversions 1 to 4 obtained by adjusting the optical power of pumping light supplied to the Bi type EDF at room temperature. Here, curves G410, G420, G430, and G440 are the respective gain spectra of population inversions 1, 2, 3, and 4. Among the four population inversions 1 to 4, the population inversion 3 was obtained when the forward pumping light power was 105 mW while the backward pumping light power was 32 mW. The most favorable gain flatness in L band was obtained in the population inversion 3.

In the population inversion 3, a relative gain non-uniformity of 14% in the net gain, an effective signal wavelength region of 1563 nm to 1615 nm, an effective signal wavelength region bandwidth of 52 nm, and an effective signal wavelength region minimum gain value of 11.8 dB were exhibited between the silica-based optical fibers connected to both ends of the Bi type EDF. The relative gain non-uniformity of this Bi type EDF was on a par with that of a C-band silica-based EDF doped with a high concentration of Al element. The effective signal wavelength region bandwidth of the Bi type EDF was much larger than the bandwidth (37 nm) of the C-band silica-based EDF doped with a high concentration of Al element. Since the background loss of the Bi type EDF is about 1.6 dB including the fusion splice loss with the silica-based optical fiber, the relative gain non-uniformity is further improved by about 1.6% if the Bi type EDF is used alone.

Figure 7A:
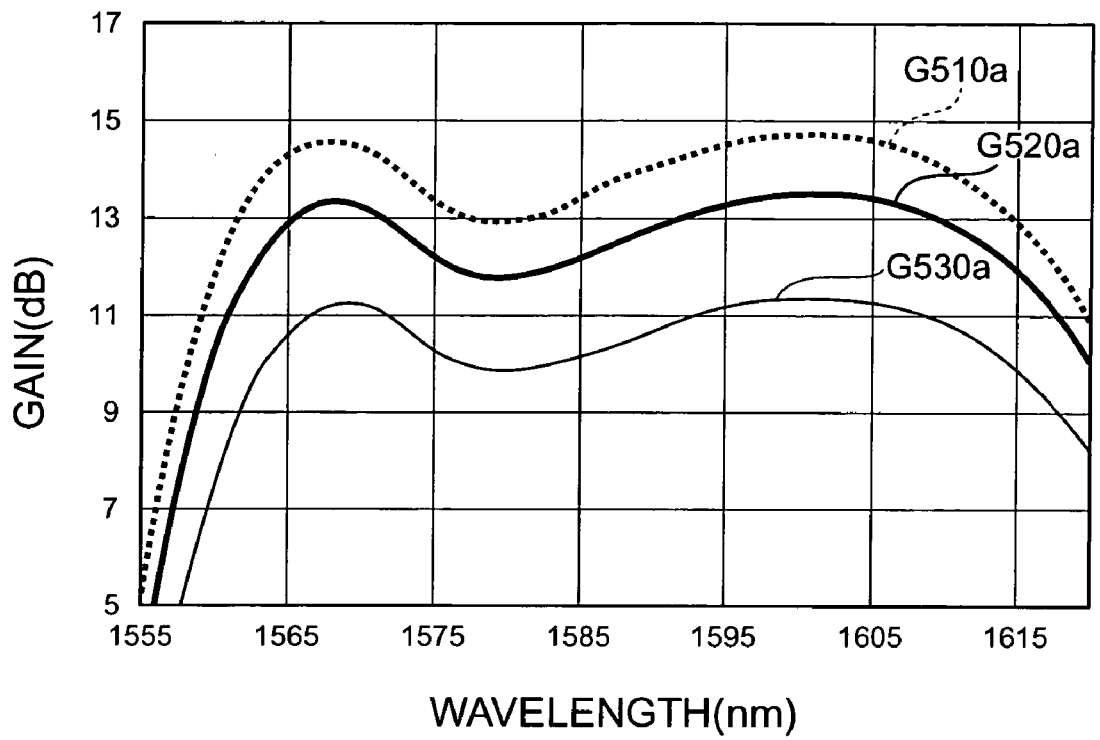
FIGS. 7A and 7B are graphs showing gain spectra of a Bi type EDF.
Figure 7B:
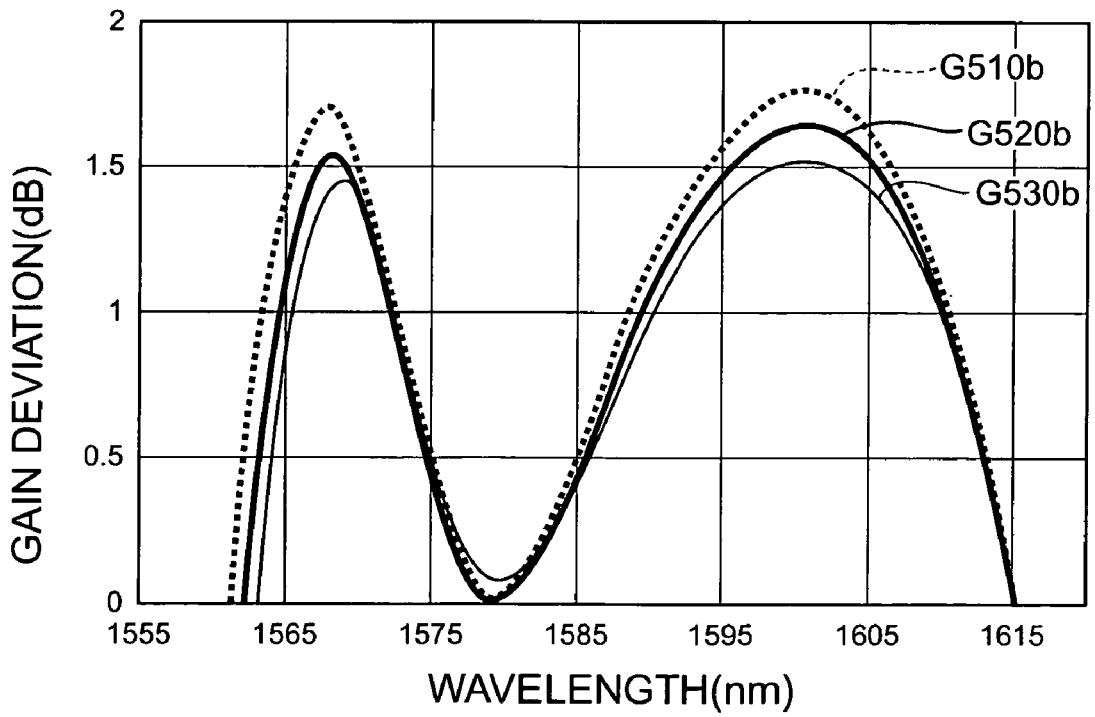

FIGS. 7A and 7B also show gain spectra of a Bi type EDF. Here, population inversions were adjusted such that two maximum gain values coincide with each other at each of 0° C., 25° C., and 65° C. within an operating temperature range required for optical communications systems of ground main line type in general. FIG. 7B is a graph enlarging the ordinate of FIG. 7A. The ordinate of FIG. 7B indicates the gain non-uniformity with reference to the minimum gain value at each temperature. In FIGS. 7A and 7B, curves G510a and G510b show gain spectra at the temperature of 0° C., curves G520a and G520b show gain spectra at the temperature of 25° C., and curves G530a and G530b show gain spectra at the temperature of 65° C.

As illustrated by FIGS. 7A and 7B, the gain is lower as the temperature is higher. Therefore, it is important to define the temperature in use when determining an unsaturated absorption peak necessary for obtaining a desirable gain flatness. Also, as shown in FIG. 7B, the gain spectra have substantially the same form within the effective signal wavelength region of 1563 nm to 1615 nm among the temperatures, whereas the effective signal wavelength region is substantially the same among the temperatures. The minimum gain value decreases as the temperature is higher, whereas the gain non-uniformity is substantially constant among the temperatures, whereby the relative gain non-uniformity deteriorates as the temperature is higher. However, the relative gain non-uniformity is 15% (14% if the background loss is excluded) even at the temperature of 65° C., which is better than the relative gain non-uniformity of the silica-based EDF for C band doped with Al element.

As can be seen from FIG. 7A, an optical amplification apparatus employing a Bi type EDF having an unsaturated absorption peak of 275 dB at room temperature satisfies the following relationship:

$$G_{min} = -0.049T + 14.6 \quad (1)$$

where $G_{min}$ (dB) is the minimum gain value within the effective signal wavelength region, and T is the temperature (° C.).

In view of homogeneous broadening approximation, the unsaturated absorption and the gain minimum value $G_{min}$ are in proportion to each other. Therefore, when a desirable gain $G_X$ (dB) is to be obtained by using a Bi type EDF at a certain operating temperature T(° C.), a flattened gain spectrum is obtained in the above-mentioned effective signal wavelength region of 1563 nm to 1615 nm by using the Bi type EDF having an unsaturated absorption peak $\alpha_T$ (dB) given by the following expression (2):

$$\alpha_T = 6122 G_X/(298-T) \quad (2)$$

Strictly speaking, the above-mentioned gain $G_X$ should include the background loss and fusion splice loss of the Bi type EDF itself. For example, in order to obtain a net gain of 25 dB in L band between the silica-based optical fibers connected to both ends of the Bi type EDF at an operating temperature of 25° C., the following expression (3) is needed to be satisfied:

$$G_X = 25 + 1 \quad (3)$$

if the total of background loss and fusion splice loss is 1 dB.

If this value of $G_X$ and the value of operating temperature, 25° C., are put into the above-mentioned expression (2), it is seen that the required unsaturated absorption peak $\alpha_T$ is about 580 dB.

If a unitary Bi type EDF is too long in signal amplification in L band, pumping light may fail to spread over the Bi type EDF. Therefore, it is preferred that a multitude of stages of Bi type EDFs be constructed, so as to supply pumping light to each stage of Bi type EDF.

Also, as mentioned above, it is important to define the temperature in use when determining the unsaturated absorption peak necessary for yielding a desirable gain flatness. Namely, it is meaningless to study the gain flatness of the Bi type EDF without defining the operating temperature. Therefore, in the optical amplification apparatus 100, 200 shown in FIGS. 4 and 5, the temperature of each Bi type EDF or nearby is detected by a temperature detecting device, and is adjusted to a target set temperature by a temperature adjusting device. In this case, in order to suppress the power consumption of the temperature adjusting device (e.g., a Peltier device or heater), the target set temperature preferably falls within a typical operating temperature range (on the order of room temperature to 40° C. in ground optical communications systems, or on the order of 0° C. to 10° C. in submarine optical communications systems) in which the optical amplification apparatus is operated.

However, since the temperature adjusting device consumes a large power while the temperature adjustment is greatly influenced by surrounding environments, highly accurate temperature control is not easy in view of various environments of use. A relatively large operating range of a Bi type EDF deteriorates the gain flatness. Therefore, it is preferable to take the measures explained in the following.

As can be seen from FIG. 7B, the amount of change $\Delta G_{min}$ (dB) in minimum gain value $G_{min}$ (dB) within the effective signal wavelength region and the temperature change $\Delta T$ (° C.) have the following relationship (4):

$$0.0036 \Delta T \approx \Delta G_{min}/G_{min}^* \quad (4)$$

where $G_{min}^*$ is the minimum gain value $G_{min}$ at a temperature of 25° C. The above-mentioned coefficient 0.0036 is greater than the coefficient 0.0026 in the case of the silica-based EDF. Using this relational expression, the following coping methods are taken.

The first method detects the temperature T of each Bi type EDF with a temperature detecting device, and adjusts the optical attenuation amount or loss spectrum according to the temperature change $\Delta T$, thereby compensating for the gain non-uniformity caused by the temperature change $\Delta T$. When a variable optical attenuator is employed, assuming that the following relationship (5) effectively holds between the amount of change $\Delta A$ of optical attenuation amount in the variable optical attenuator and the amount of temperature change $\Delta T$ in the Bi type EDF:

$$\Delta A = -C_1 \Delta T \quad (5)$$

where $C_1$ is a positive constant, the amount of change $\Delta A$ of optical attenuation amount in the variable optical attenuator is determined. The optical attenuation amount in the variable optical attenuator is adjusted by the amount of change $\Delta A$. Instead of using such an arithmetic expression, the relationship between the optical attenuation amount in the variable optical attenuator and the temperature T of the Bi type EDF may be actually measured and stored into a memory within the control unit 190, 290 before starting the optical amplification apparatus to operate, and control may be carried out according to thus stored relationship.

The second coping method actively regulates the temperature of each Bi type EDF with a temperature adjusting device by feedback control or feedforward control. Utilizing the relationship of the above-mentioned expression (3), the relationship between the gain change amount $\Delta G$ and the temperature change amount $\Delta A$ of the Bi type EDF is given by the following expression (6):

$$\Delta G = -C_2 \Delta T \quad (6)$$

where $C_2$ is a positive constant. Each temperature adjusting device adjusts the temperature of its corresponding Bi type EDF by the change amount ΔT. Instead of using such an arithmetic expression, the relationship between the gain G and the temperature T of the Bi type EDF may be actually measured and stored into a memory within the control unit 190, 290 before starting the optical amplification apparatus to operate, and control may be carried out according to thus stored relationship.

The gain change ΔG is obtained according to the detection of input and output signal light powers by the light-receiving devices 151, 152 of the optical amplification apparatus 100 or the light-receiving devices 251, 252 of the optical amplification apparatus 200. Alternatively, the gain change ΔG may be determined according to a desirable gain (coinciding with the loss of optical fiber transmission lines installed) sent from an upper monitoring network of the optical communications system.

The first and second coping methods may be used together with a method in which each temperature adjusting device adjusts the temperature of its corresponding Bi type EDF to a predetermined value. For example, it will be suitable if a method in which each temperature adjusting device adjusts the temperature of its corresponding Bi type EDF to a predetermined value is usually used whereas the first coping method is employed when the temperature adjusting device fails. Such a coping method further improves the reliability of the optical communications system 1.

Even when the fluctuation in the minimum gain value is compensated for by employing these coping methods, gain spectrum forms slightly vary depending on temperature as can be seen from FIG. 7B. The gain non-uniformity in the effective signal wavelength region is greater at a temperature of 0° C. by about 0.2 to 0.3 dB than that at a temperature of 65° C. The minimum gain value in the effective signal wavelength region is about 10 dB in FIGS. 7A and 7B. If the minimum gain value in the effective signal wavelength region is 20 dB, a difference of 0.4 to 0.6 dB will occur between the respective gain non-uniformities at temperatures of 0° C. and 65° C. in the effective signal wavelength region, and thus cannot be neglected in practice.

For coping with such a matter, it is preferred that light-losing components have a loss spectrum in the same form as that of a Bi type EDF at a center temperature or typical temperature of an operating temperature range. Though gain non-uniformities are caused by temperature variations in this case, these gain non-uniformities can be suppressed to a low level.

Since the gain non-uniformities caused by temperature variations change substantially by multiples of a constant, light-losing components having a loss spectrum adjustable in such a fashion are also utilized preferably. For example, such a light-losing component may be configured as a Mach-Zehnder interferometer including a gain equalizer, disposed on one of optical paths, having the same form of loss spectrum as with that at the lower limit of the operating temperature range, while the other optical path acts as a simple bypass.

In the case where not only the Bi type EDFs 231, 232 but also the silica-based EDF 233 amplifies signal light as in the optical amplification apparatus 200 shown in FIG. 5, temperature dependence differs between Bi and silica-based EDFs, whereby it is preferred that a separate temperature detecting device be provided when employing the first coping method. When the second coping method is employed, since each Bi type EDF can adjust the gain more efficiently even in slighter temperature variations than does the silica-based EDF, it is preferred that the Bi type EDF be longer than the silica-based EDF.

Figure 8:
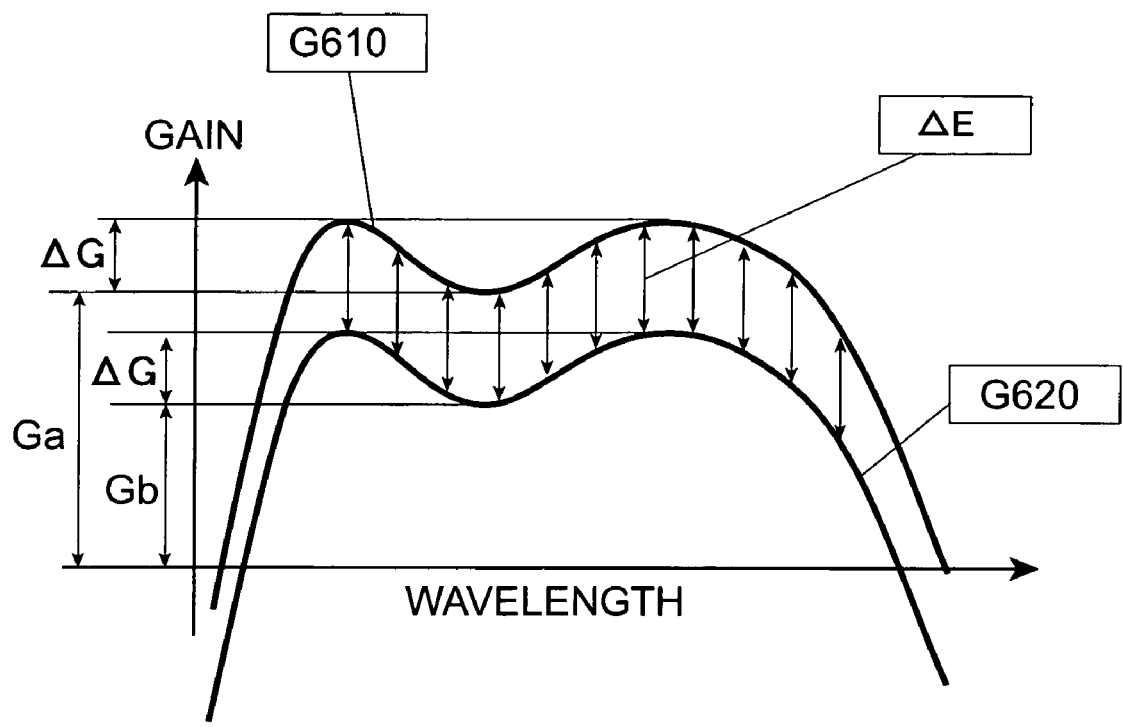
FIG. 8 is a graph showing typical gain spectra prepared for explaining a relationship between relative gain non-uniformity and background loss in the net gain of a Bi type EDF.

As explained in connection with the above-mentioned expression (3), even when the gain spectrum is flat in a Bi type EDF because of the Er transition therein, the relative gain non-uniformity in the net gain of the Bi type EDF deteriorates if background loss is large. FIG. 8 is a graph for explaining a relationship between relative gain non-uniformity and background loss in the net gain of a Bi type EDF. As illustrated in this graph, the net gain spectrum G620 of the Bi type EDF is obtained by subtracting the loss ΔE composed of background loss and fusion loss from the gain spectrum G610 caused by the Er transition. Though the difference ΔG between the maximum gain value and minimum gain value does not change, the minimum gain value $G_b$ in the net gain spectrum of the Bi type EDF is lower than the minimum gain value $G_a$ of the gain spectrum because of the Er transition. Therefore, the relative gain non-uniformity in the net gain of the Bi type EDF deteriorates as the background loss is greater. The Bi type EDFs whose gain spectra are shown in FIGS. 6, 7A, and 7B exhibit a particularly small background loss, thereby yielding a small relative gain non-uniformity even as a net gain. Typically, however, Bi type EDFs exhibit a background loss of about 2 dB/m.

For simplification, operations at room temperature will be explained in the following. The permissible value of background loss $\alpha_B$ (dB/m) of the Bi type EDF and the absorption peak α (dB/m) inherent in Er satisfy the following relationship (7):

$$(0.12 \times 0.042 \times \alpha)/(0.042 \times \alpha - \alpha_B) \leq \text{the relative gain non-uniformity of net gain} \quad (7)$$

where the constant value 0.12 is the relative gain non-uniformity neglecting the background loss actually measured from the gain spectrum of population inversion 3 shown in FIG. 6, and the constant value 0.042 is the ratio of the gain $G_x$, which is obtained when a typical operating temperature 40° C. in a ground system is put into the above-mentioned expression (2) as the temperature T, to the absorption peak. As mentioned above, level diagram designing may fail to be on a par with a silica-based EDF for C band if the target value of relative gain non-uniformity exceeds 19%, and advantages over P/Al-codoped silica-based EDFs may be lost if the target value exceeds 25%. Therefore, the target value of relative gain non-uniformity is preferably 25% or less, more preferably 19% or less.

Hence, if the relative gain non-uniformity of net gain in the right side in the above-mentioned expression (7) is 25% or 19%, the relationship of the following expression (8a) or (8b):

$$\alpha_B \leq 0.021\alpha \quad (8a)$$

$$\alpha_B \leq 0015\alpha \quad (8b)$$

is obtained from the above-mentioned expression (7).

Since the background loss $\alpha_B$ (dB/m) of the Bi type EDF is typically about 2 dB/m as mentioned above, the absorption peak a inherent in Er is preferably 95 dB/m or more, more preferably 143 dB/m or more. The coefficients in the right sides of the above-mentioned expressions (8a) and (8b) may vary depending on assumed operating temperatures. These coefficients increase as the operating temperature decreases.

The fluorescent characteristic of Bi type EDFs has been known to differ from that of silica-based EDFs. In particular, the bulge of fluorescent characteristic observed in the vicinity of a wavelength of 1480 nm in Bi type EDFs is a feature not observed in silica-based EDFs. Also, since there is a correlation between the fluorescent characteristic and absorption characteristic, an absorption peak is supposed to exist near the wavelength of 1480 nm in Bi type EDFs.

When amplifying signal light in C band, a high absorption efficiency for the pumping light in the 1.48-μm wavelength band is desirable, since it leads to improvement of the pumping efficiency. When amplifying signal light in L band, however, the unsaturated absorption peak in use is so large that the pumping efficiency and noise figure may deteriorate if the pumping light absorption is too high as compared with the signal light gain. Therefore, when amplifying signal light in L band by using a Bi type EDF, the pumping light wavelength is preferably shorter than 1.48 μm.

Figure 9:
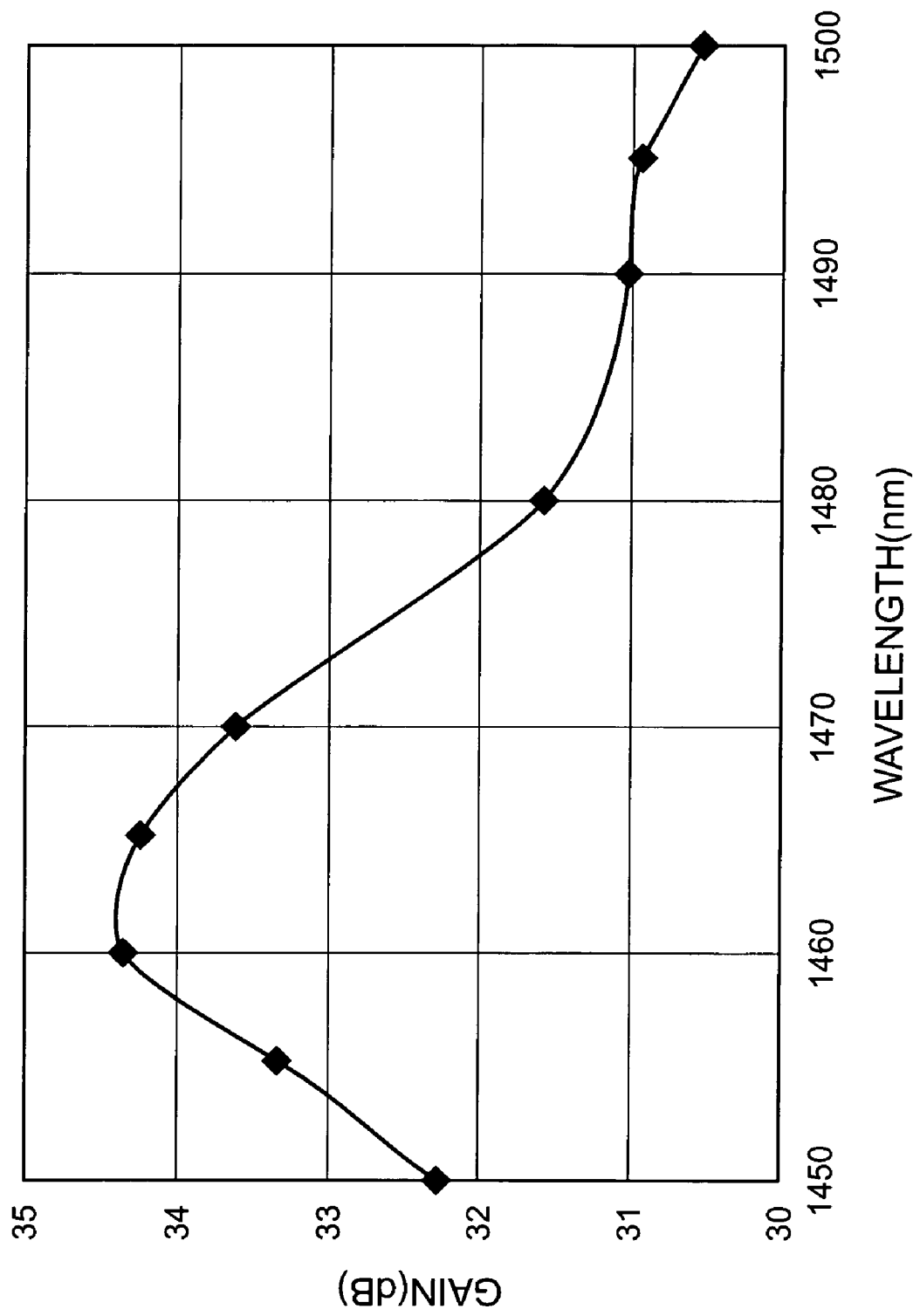
FIG. 9 is a graph showing a relationship between pumping light wavelength and gain.

FIG. 9 is a graph showing a relationship between pumping light wavelength and gain. This graph was obtained when pumping light having an output of 50 mW was bidirectionally supplied to the Bi type EDF explained in connection with FIGS. 6, 7A, and 7B. The input signal light had a channel wavelength of 1565 nm and a power of −35 dBm. The channel wavelength of the pumping light was changed within the range from 1450 nm to 1500 nm. As can be seen from this graph, the highest gain is obtained when the pumping light wavelength is near 1460 nm. The most desirable pumping light wavelength is about 1463 nm.

Even when the actual pumping light wavelength deviates from the most desirable pumping light wavelength, the adverse effect caused by this wavelength deviation can be eliminated by utilizing optical components having a low insertion loss. When an optical amplification apparatus is constituted by a single stage of Bi type EDF alone, as shown in FIG. 4, a monitor optical coupler, an optical isolator, and a pumping light feeding optical coupler are typically inserted into each of the input and output sides of the Bi type EDF. Each of these individual optical components can lower the insertion loss by about 0.2 dB from its typical value. Therefore, the permissible range of pumping light wavelength falls within a wavelength range, centered at the gain peak wavelength shown in FIG. 9, yielding a gain smaller than the gain peak by about 1.2 dB, i.e., a wavelength range of about ±10 nm. For stabilizing the pumping light wavelength, a pumping light source constituted by a combination of a laser diode and a resonance grating is suitable. As the resonance grating, a grating formed in an optical fiber is inexpensive for use.

Figure 10:
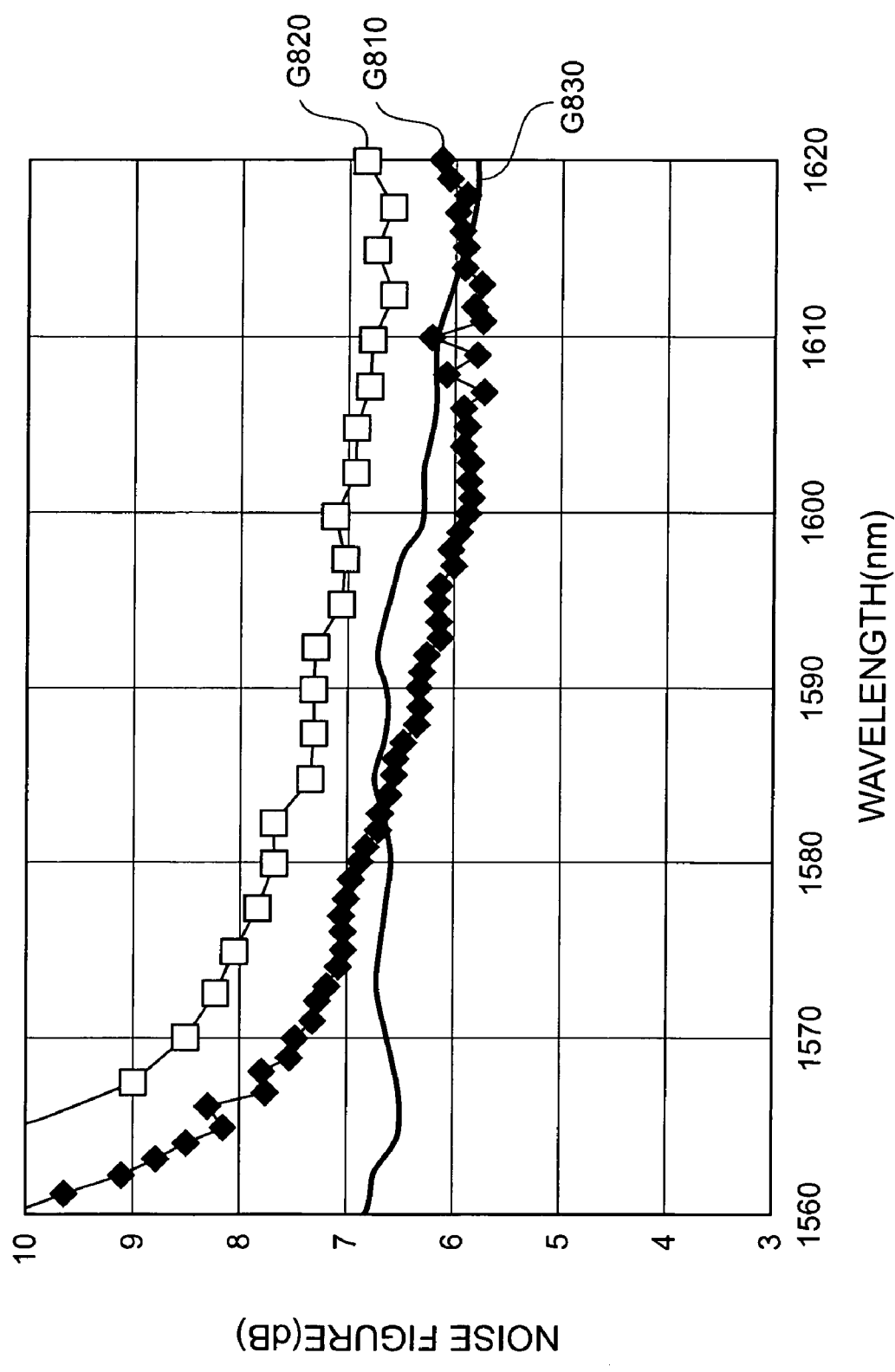
FIG. 10 is a graph showing a relationship between signal light wavelength and noise figure.

FIG. 10 is a graph showing a relationship between signal light wavelength and noise figure. In FIG. 10, curves G810, G820, and G830 show respective noise figures of a Bi type EDF, a P-codoped silica-based EDF, and a P/Al-codoped silica-based EDF. The optical power of total input signal light to each EDF was 0 dBm. The Bi type EDF was the one explained in connection with FIGS. 6, 7A, and 7B, to which pumping light having an output of 60 mW was bidirectionally supplied. To the P/Al-codoped silica-based EDF, pumping light having an output of 27 mW was bidirectionally supplied. To the P-codoped silica-based EDF, pumping light having an output of 100 mW was forwardly supplied.

As can be seen from this graph, the noise figure of the Bi type EDF is inferior to that of the P/Al-codoped silica-based EDF on the shorter wavelength side, e.g., by 1 dB or more near a wavelength of 1565 nm. This is because of the fact that the background loss within the Bi type EDF and its fusion splice loss with silica-based optical fibers are high. Also, there is a fear of concentration quenching. Thus, Bi type EDFs are inferior to silica-based EDFs in terms of noise figure and pumping efficiency.

In view of such circumstances, for improving the noise figure, it is preferred that a silica-based EDF be disposed near an input end of the optical amplification apparatus or immediately downstream an optical component having a large insertion loss such as a dispersion-compensating optical fiber. For improving the pumping efficiency, it is preferred that the silica-based EDF be disposed near an output end of the optical amplification apparatus or immediately upstream an optical component having a large insertion loss such as a dispersion-compensating optical fiber.

However, Al-codoped silica-based EDFs used in general drastically lower their gain on the longer wavelength side from a wavelength of 1600 nm, thereby losing a flat gain spectrum form over a wide band which is a characteristic feature of Bi type EDFs. Therefore, it is preferable to use a P/Al-codoped silica-based EDF exhibiting a gain on the longer wavelength side as well.

Also, as mentioned above, the P/Al-codoped silica-based EDF has a large relative gain non-uniformity, which makes it practically problematic to use the P/Al-codoped silica-based EDF alone. Hence, it is preferred to use the P/Al-codoped silica-based EDF and Bi type EDF in combination. Preferably, a silica-based EDF is doped with at least one of Al and La elements in addition to P element. When doped with none of trivalent ions, the silica-based EDF remarkably deteriorates its noise figure as shown in FIG. 10 even in the case of forward pumping at 100 mW. Without being restricted to Al and La elements, elements adapted to become trivalent ions seem to function similarly.

A gain spectrum equivalent to that of the P/Al-codoped silica-based EDF can also be realized when further codoped with Yb element acting to improve the sensitivity to the pumping light in the 0.98-μm wavelength band. The Yb codoping is suitable when using a high-output pumping laser, as in cladding pumping in particular.

As in the foregoing, the optical amplification apparatus 100, 200 according to the present invention uses a Bi type EDF as an optical amplification medium, thereby being practical without problems of thermal damages and toxicity, and making it possible to lower the relative gain non-uniformity in a wide band of effective signal wavelength region included in L band. The optical communications system 1 including the optical amplification apparatus 100, 200 can transmit/receive a large volume of information by using L band. The optical amplification apparatus 100, 200 according to the present invention can reliably lower the relative gain non-uniformity in the wide band of effective signal wavelength region by optimizing the population inversion, temperature, and unsaturated absorption peak of the Bi type EDFs in particular. The optical amplification apparatus 100, 200 according to the present invention can raise the pumping efficiency by optimizing the pumping light wavelength. The noise figure becomes excellent when a P/Al-codoped silica-based EDF is used in addition to the Bi type EDFs.

Without being restricted to the above-mentioned embodiments, the present invention can be modified in various manners. For example, multiplexed signal light may be Raman-amplified in optical fiber transmission lines and dispersion-compensating optical fibers, whereby the noise figure can further be improved.

As shown in FIGS. 7A and 7B, Er-doped Bi type EDFs have such a tendency that the gain flattened by optimizing the population inversion occurring in the optical waveguide region through which signal light propagates becomes smaller as temperature is higher in a state maintaining the gain spectrum form (see the above-mentioned expression (4)). Utilizing the relationship shown in expression (4), an optical amplification apparatus realizing the following control method is obtained.

Optical communications systems incur a fear of fluctuating their transmission line loss because of changes in environmental temperature near a transmission optical fiber and the like, i.e., span loss fluctuation. Here, it is desirable for the optical amplification apparatus to change its operation gain in conformity to the span loss.

Figure 11:
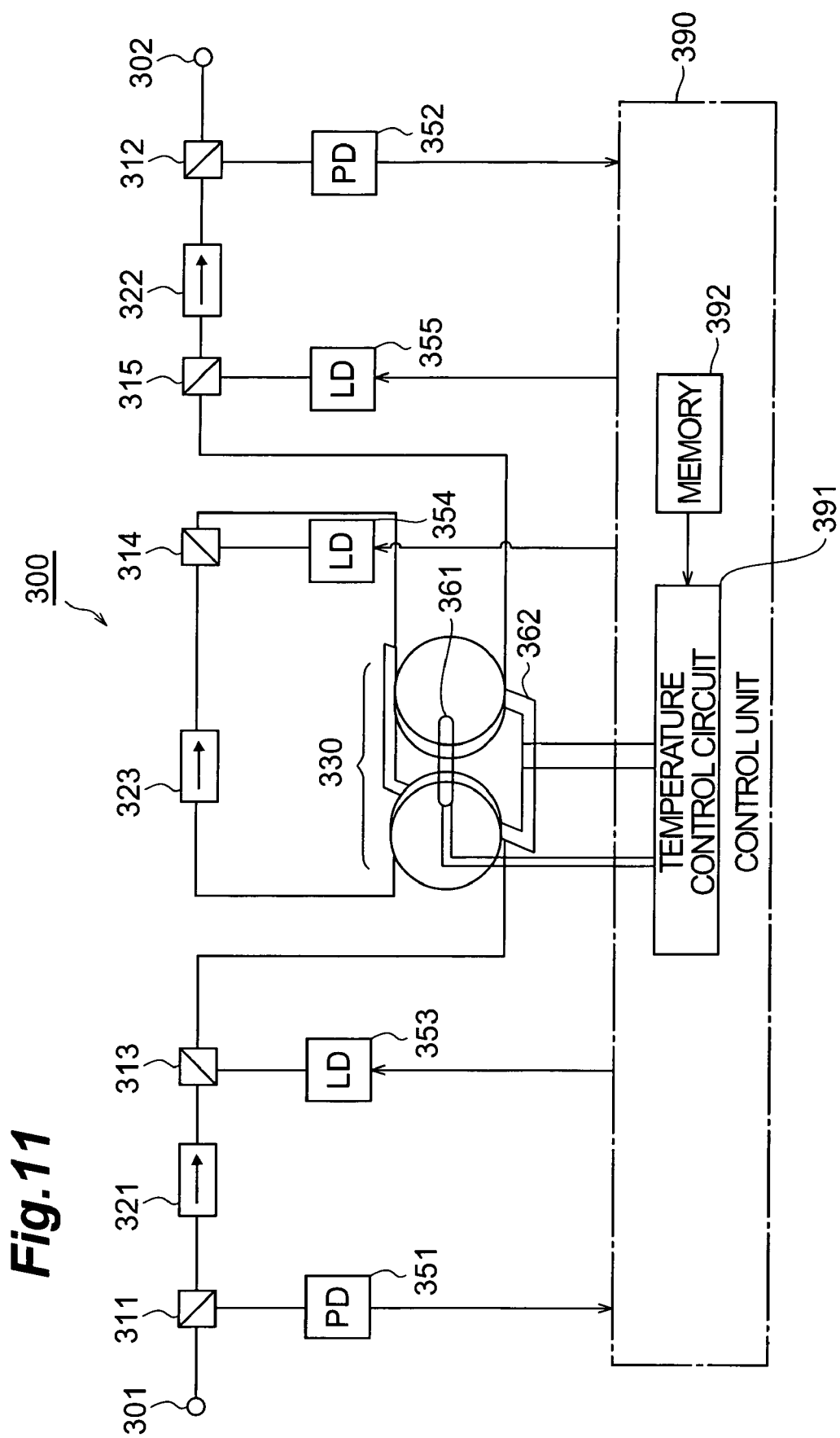
FIG. 11 is a diagram showing the configuration of a third embodiment of the optical amplification apparatus according to the present invention.

As a control method therefor, fluctuations in actual gain may be detected from the ratio between input and output monitoring results as shown in the optical amplification apparatus 300 according to a third embodiment shown in FIG. 11, and the temperature of the Er-doped Bi type EDF may be controlled according to the above-mentioned expression (4). In many cases, it is necessary for the optical amplification apparatus to keep its output constant, whereby a control unit is also necessary for feedback-controlling the pumping light power so as to keep the monitored output constant. In this case, since the output is constant, the temperature control for Er-doped Bi type EDFs maybe carried out according to the fluctuation in monitored input.

When the input level is held constant while only the output level is needed to be adjusted depending on the state of transmission lines, as in a booster amplifier in a repeaterless communications system, it is possible to carry out control according to the fluctuation in monitored output alone.

Not only the span loss but also the number of channels of multiplexed signal light may fluctuate in an optical fiber network. If the input and output powers are monitored by light-receiving devices such as photodiodes alone, the span loss fluctuation and the signal channel number fluctuation may be mistaken for each other. Therefore, a mode of control may utilize an optical performance monitor (OPM) as in the optical amplification apparatus 400 according to a fourth embodiment shown in FIG. 12, or acquire information such as the amount of span loss from an upper monitor system for monitoring the whole network as in the optical amplification apparatus 500 according to a fifth embodiment shown in FIG. 13.

FIG. 11 is a diagram showing the configuration of third embodiment of the optical amplification apparatus according to the present invention. The optical amplification apparatus 300 shown in this diagram comprises, successively from its input end 301 to output end 302, an optical coupler 311, an optical isolator 321, an optical coupler 313, a Bi type EDF 330, an optical isolator 323, an optical coupler 314, the Bi type EDF 330, an optical coupler 315, an optical isolator 322, and an optical coupler 312. The optical amplification apparatus 300 also comprises a light-receiving device 351 (PD) connected to the optical coupler 311, a light-receiving device 352 (PD) connected to the optical coupler 312, a pumping light source 353 (LD) connected to the optical coupler 313, a pumping light source 354 connected to the optical coupler 314, a pumping light source 355 connected to the optical coupler 315, a temperature detecting device 361 (thermistor) and a temperature adjusting device 362 (Peltier device) which are disposed in contact with or in the vicinity of the Bi type EDF 330, and a control unit 390 for feedback-controlling operations of the optical amplification apparatus 300 as a whole. The control unit 390 comprises a temperature control circuit 391 for controlling the temperature adjusting device 362 according to the detected information from the temperature detecting device 361, and a memory 392 for storing actually measured data beforehand for enabling faster feedback control.

For maintaining the gain flatness at a high accuracy of about ±1 dB, the control unit 390 carries out the following control, for example. Namely, the control unit 390 regulates the temperature change amount $\Delta T$ (K) of the Bi type EDF so as to satisfy the following relationship:

$$(\Delta T \cdot G_{min}) \times 0.0036 - 1.2 \leq \Delta G < (\Delta T \cdot G_{min}) \times 0.0036 + 1.2$$

where $G_{min}$ (dB) is the minimum value of actual gain within the signal wavelength band at 25° C. in the Bi type optical waveguide 330 alone. Here, for enabling faster gain flatness control, actually measured data of $\Delta G$ (dB) and $\Delta T$ (K) during an actual operation of the optical amplification apparatus 300 are stored into the memory 392 of the control unit 390.

Figure 12:
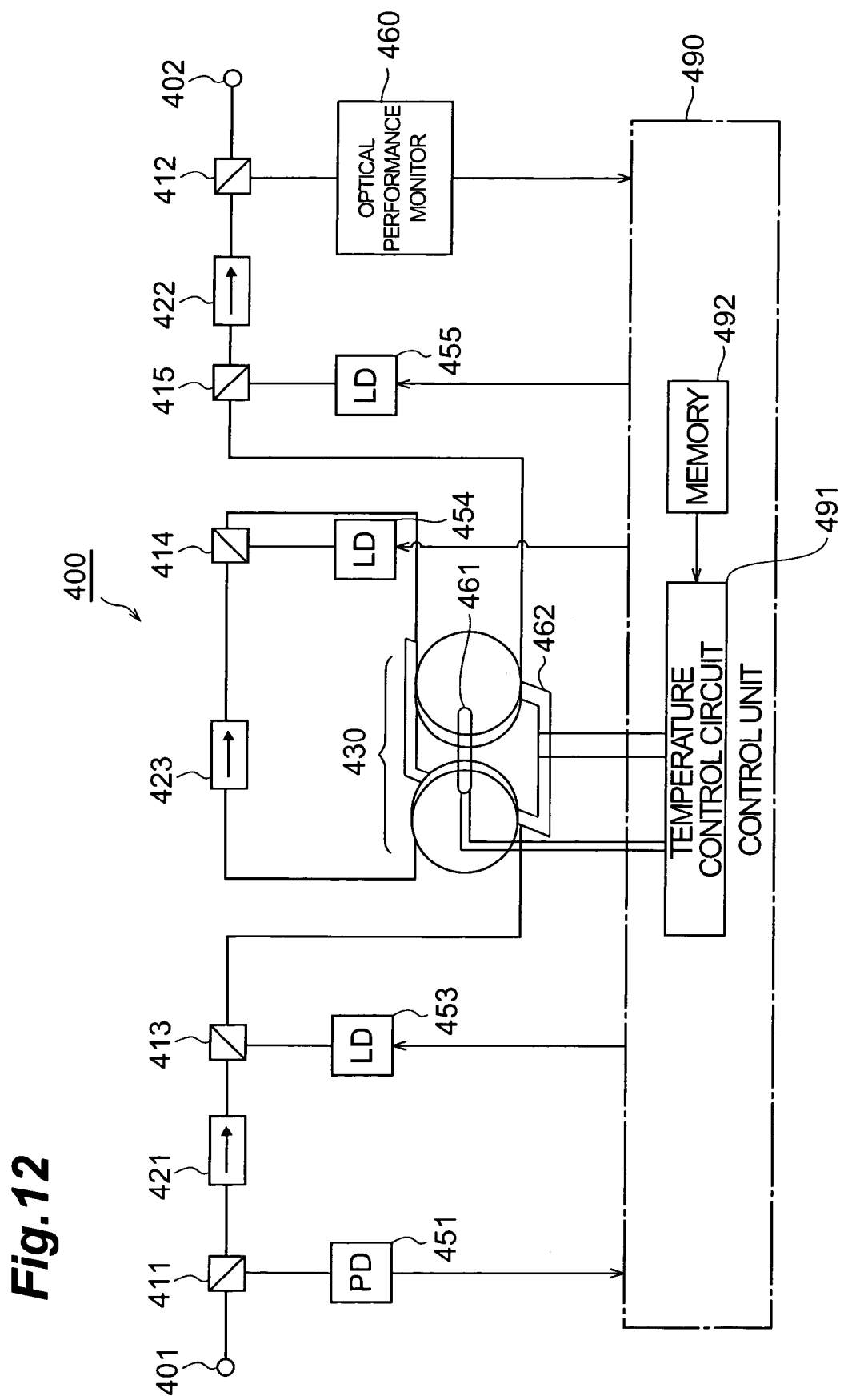
FIG. 12 is a diagram showing the configuration of a fourth embodiment of the optical amplification apparatus according to the present invention.

FIG. 12 is a diagram showing the configuration of fourth embodiment of the optical amplification apparatus according to the present invention. The optical amplification apparatus 400 shown in this diagram comprises, successively from its input end 401 to output end 402, an optical coupler 411, an optical isolator 421, an optical coupler 413, a Bi type EDF 430, an optical isolator 423, an optical coupler 414, the Bi type EDF 430, an optical coupler 415, an optical isolator 422, and an optical coupler 412. The optical amplification apparatus 400 also comprises a light-receiving device 451 (PD) connected to the optical coupler 411, an optical performance monitor 460 (OPM) connected to the optical coupler 412, a pumping light source 453 (LD) connected to the optical coupler 413, a pumping light source 453 (LD) connected to the optical coupler 413, a pumping light source 454 connected to the optical coupler 414, a pumping light source 455 connected to the optical coupler 415, a temperature detecting device 461 (thermistor) and a temperature adjusting device 462 (Peltier device) which are disposed in contact with or in the vicinity of the Bi type EDF 430, and a control unit 490 for regulating operations of the optical amplification apparatus 400 as a whole. The control unit 490 comprises a temperature control circuit 491 for controlling the temperature adjusting device 462 according to the detected information from the temperature detecting device 461, and a memory 492 for storing actually measured data beforehand for enabling faster feedback control.

Figure 13:
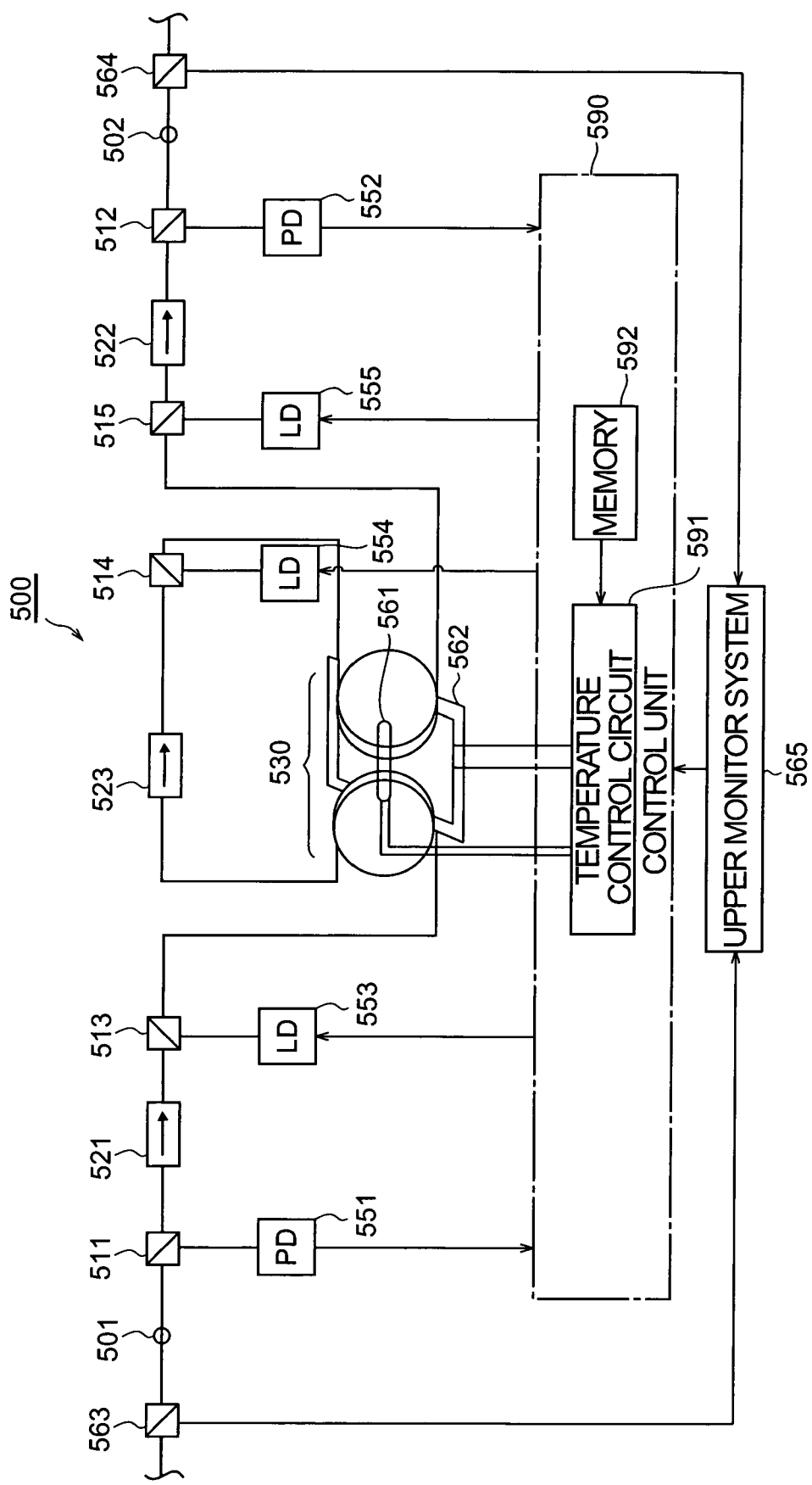
FIG. 13 is a diagram showing the configuration of a fifth embodiment of the optical amplification apparatus according to the present invention.

FIG. 13 is a diagram showing the configuration of fifth embodiment of the optical amplification apparatus according to the present invention. The optical amplification apparatus 500 shown in this diagram comprises, successively from its input end 501 to output end 502, an optical coupler 511, an optical isolator 521, an optical coupler 513, a Bi type EDF 530, an optical isolator 523, an optical coupler 514, the Bi type EDF 530, an optical coupler 515, an optical isolator 522, and an optical coupler 512. The optical amplification apparatus 500 also comprises a light-receiving device 551 (PD) connected to the optical coupler 511, a light-receiving device 552 (PD) connected to the optical coupler 512, a pumping light source 553 (LD) connected to the optical coupler 513, a pumping light source 554 connected to the optical coupler 514, a pumping light source 555 connected to the optical coupler 515, a temperature detecting device 561 (thermistor) and a temperature adjusting device 562 (Peltier device) which are disposed in contact with or in the vicinity of the Bi type EDF 530, and a control unit 590 for feedback-controlling operations of the optical amplification apparatus 500 as a whole. The optical amplification apparatus 500 further comprises an upper monitor system 563 for monitoring the light propagating through external transmission lines by optical couplers 561, 562, so as to acquire information such as span loss amount. The control unit 590 comprises a temperature control circuit 591 for controlling the temperature adjusting device 562 according to the detected information from the temperature detecting device 561, and a memory 592 for storing actually measured data beforehand for enabling faster feedback control.

In the above-mentioned modes of control, it is industrially important with which accuracy the temperature of the Er-doped Bi type EDF should be regulated. In normal optical communications systems on the ground, one repeating station for amplification is required to have a gain non-uniformity of ±1 dB at the maximum in general. As can be seen from the graph of FIG. 14, for satisfying a gain non-uniformity of ±1 dB in a passband of 1563 nm to 1615 nm, it is necessary to regulate $G_{min}$ (the minimum gain value of the Bi type EDF alone at 25° C.) with an accuracy of 1.2 dB.

Figure 14:
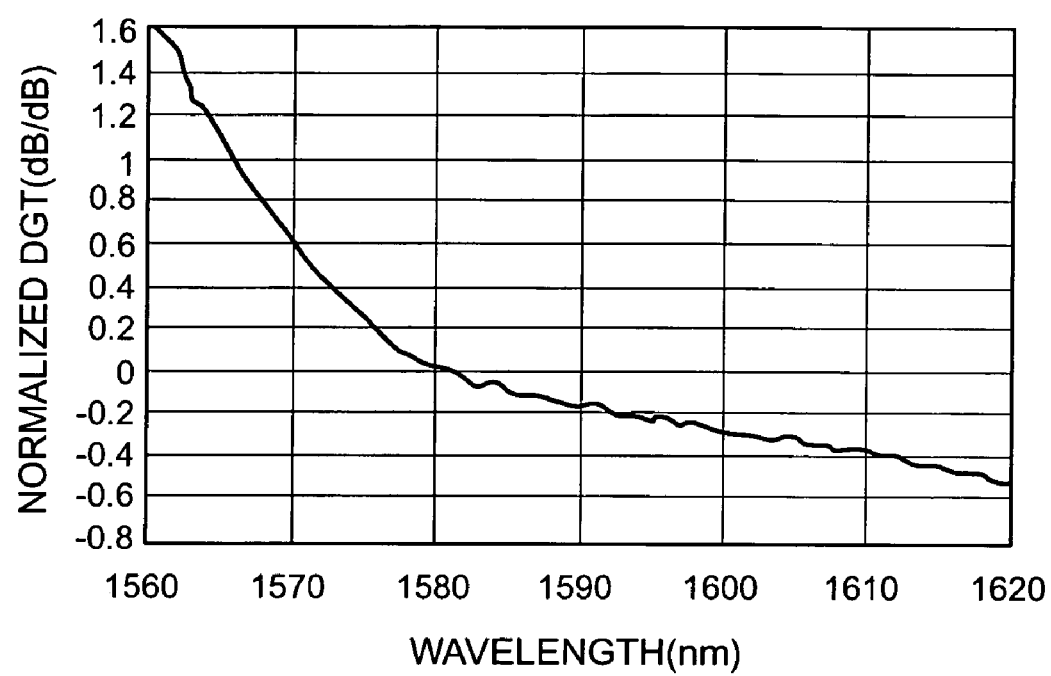
FIG. 14 is a graph showing a relationship between signal light wavelength and standardized DGT.

FIG. 14 is a graph showing a relationship between signal light wavelength at room temperature and standardized dynamic gain tilt (DGT). The standardized DGT is given by the following expression (9):

$$(\Delta G - \Delta G_M)/\Delta G_M \qquad (9)$$

where $\Delta G$ is DGT, and $\Delta G_M$ is the fluctuation of $G_M$ averaged in the whole passband region.

In view of FIG. 14, the standardized DGT occurring in the passband of 1563 nm to 1615 nm is 1.7 $dB_{p-p}$. It is seen that, in order for this standardized DGT to fall within the range of ±1 dB (i.e., 2 $dB_{p-p}$), $\Delta G_{min}$ must be regulated with an accuracy of ±(2/1.7), i.e., ±1.2 dB.

When the temperature of Er-doped Bi type EDF is regulated by carrying out the foregoing arithmetic operations, high-speed control is hard to achieve. In such a case, as in the above-mentioned third to fifth embodiments, it is preferred that the relationship between actual gain and the optimal value of temperature of Er-doped Bi type EDF be actually measured at the time of shipment or initial installation of the optical amplification apparatus and stored into the memory within the control unit.

Figure 16:
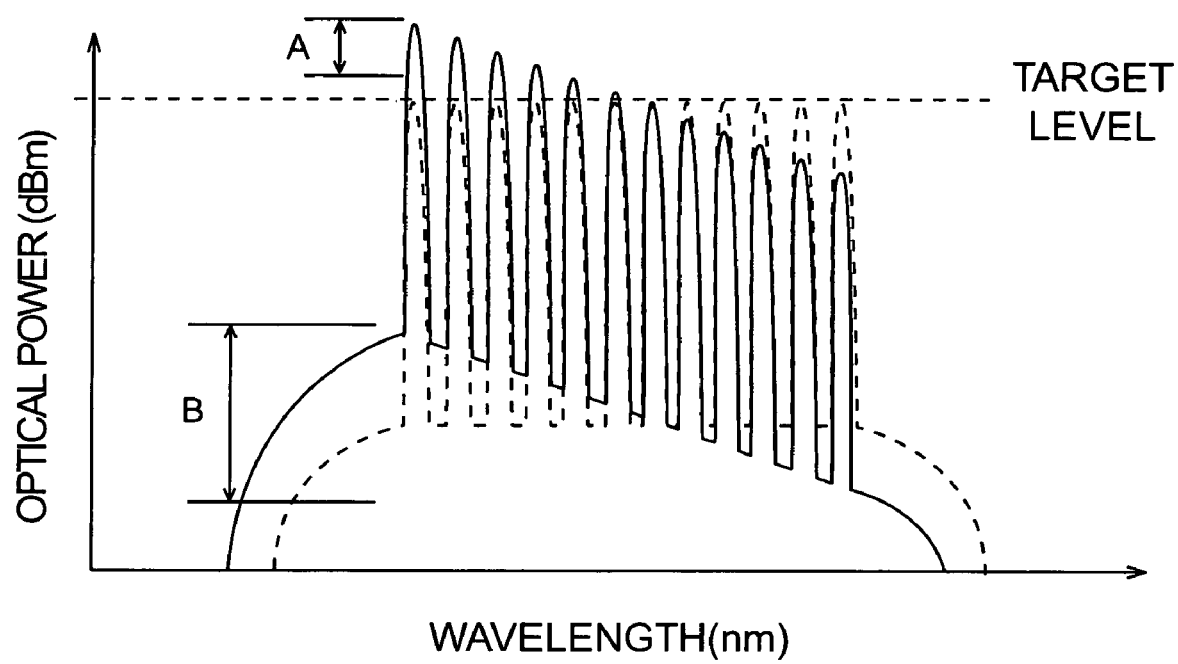
FIG. 16 is a graph showing a signal output spectrum for explaining gain tilt control.

Further, even when the actual gain is unknown, the gain tilt may be detected, so as to feedback-control the temperature of Er-doped Bi type EDF. Namely, the signal output spectrum may be monitored by an optical performance monitor (OPM), so as to detect its gain tilt, and feedback-control may be carried out such that the Er-doped Bi type EDF is heated and cooled when the gain tilt is positive and negative, respectively, whereby the output spectrum can always be kept flat. In the case of EDFA, the same effects can be obtained if at least the signal level of a certain channel or ASE is monitored as shown in FIG. 16. When monitoring the signal level of a channel, it is necessary to note the possibility of the monitoring channel disappearing upon introduction of ADM. In FIG. 16, area A indicates the signal level monitoring area, whereas area B indicates the ASE monitoring area.

Figure 15:
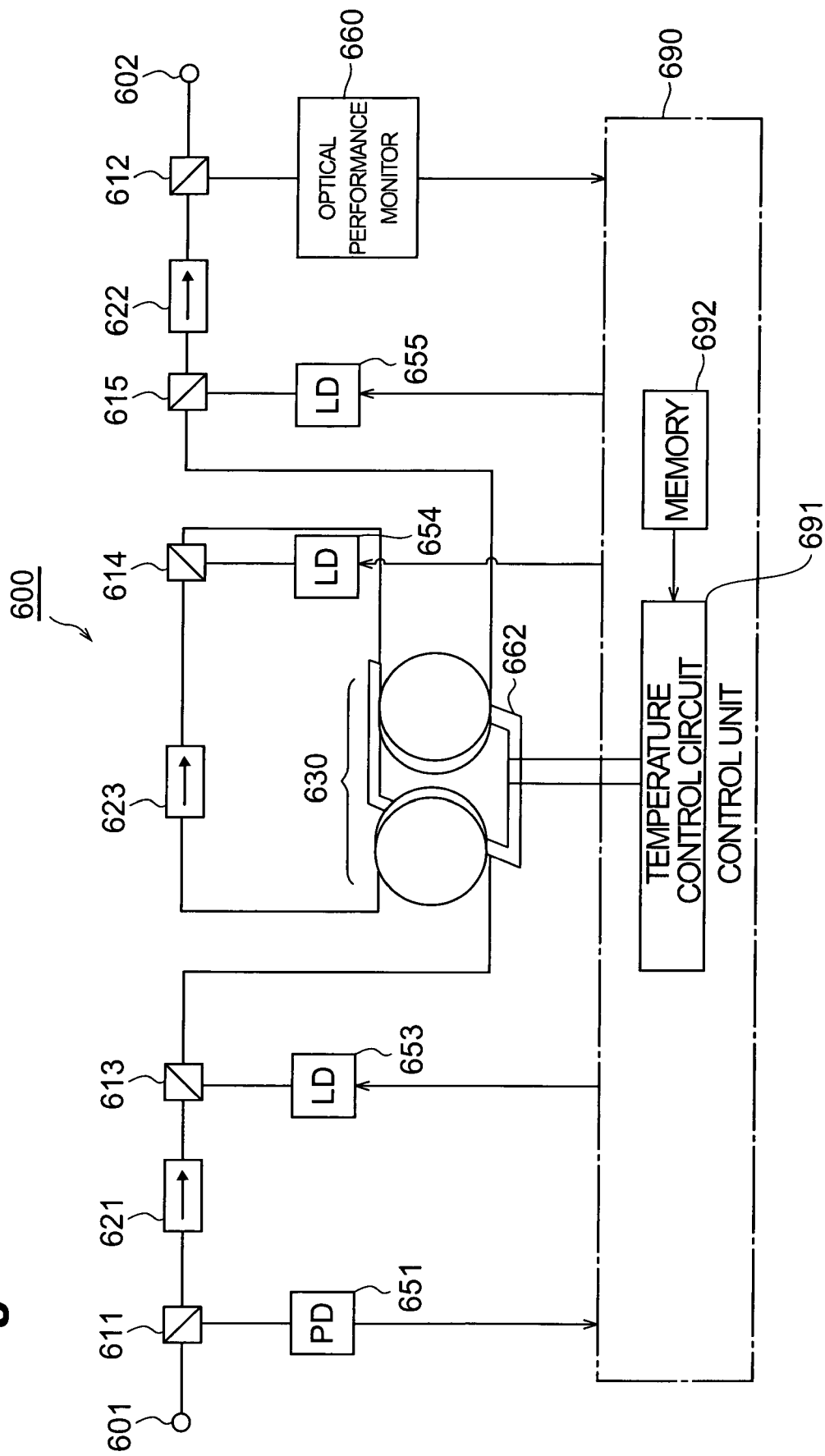
FIG. 15 is a diagram showing the configuration of a sixth embodiment of the optical amplification apparatus according to the present invention.

FIG. 15 is a diagram showing the configuration of a sixth embodiment of the optical amplification apparatus according to the present invention. The optical amplification apparatus 600 shown in this diagram comprises, successively from its input end 601 to output end 602, an optical coupler 611, an optical isolator 621, an optical coupler 613, a Bi type EDF 630, an optical isolator 623, an optical coupler 614, the Bi type EDF 630, an optical coupler 615, an optical isolator 622, and an optical coupler 612. The optical amplification apparatus 600 also comprises a light-receiving device 651 (PD) connected to the optical coupler 611, an optical performance monitor 660 (OPM) connected to the optical coupler 612, a pumping light source 653 (LD) to the optical coupler 613, a pumping light source 654 connected to the optical coupler 614, a pumping light source 655 connected to the optical coupler 615, a temperature adjusting device 662 (Peltier device) disposed in contact with or in the vicinity of the Bi type EDF 630, and a control unit 690 for regulating operations of the optical amplification apparatus 600 as a whole. The control unit 690 comprises a temperature control circuit 691 for feedforward-controlling the temperature adjusting device 662, and a memory 692 for storing actually measured data beforehand for enabling faster feedback control.

In an optical communications system, the temperature of an Er-doped Bi type EDF may fluctuate because of changes in temperature within a repeating station, whereby the phenomenon shown in FIG. 7A may cause a gain tilt. In such a case, the temperature of Er doped Bi type EDF may be stabilized by combining a thermistor and a Peltier device as in the third embodiment shown in FIG. 11, for example. Alternatively, as in the optical amplification apparatus according to a seventh embodiment shown in FIG. 17, an optical device having a variable transmission spectrum may be utilized. An example of such optical device having a variable transmission spectrum is a variable attenuator.

Figure 17:
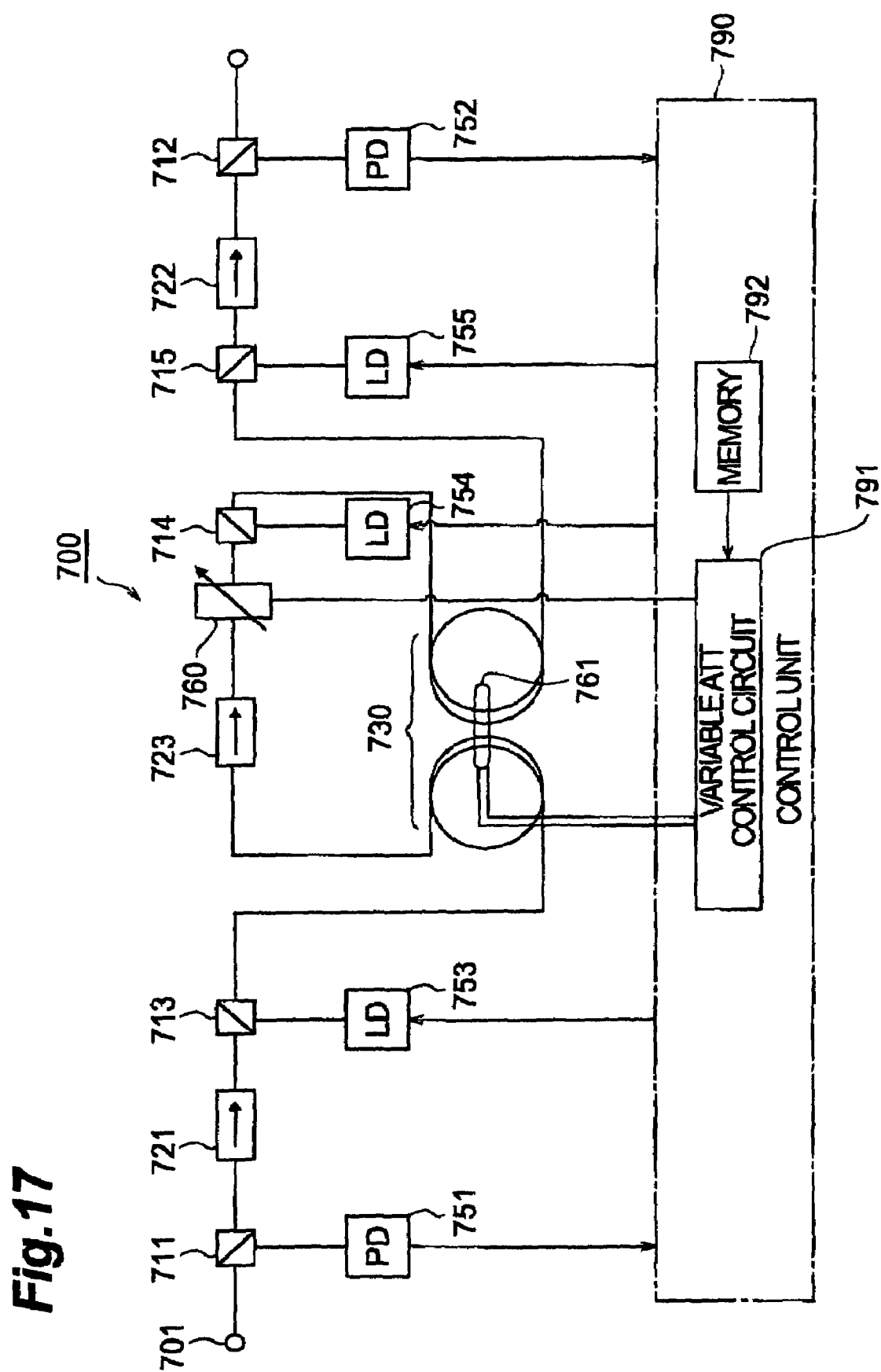
FIG. 17 is a diagram showing the configuration of a seventh embodiment of the optical amplification apparatus according to the present invention.

FIG. 17 is a diagram showing the configuration of seventh embodiment of the optical amplification apparatus according to the present invention. The optical amplification apparatus shown in this diagram comprises, successively from its input end 701 to output end 702, an optical coupler 711, an optical isolator 721, an optical coupler 713, a Bi type EDF 730, an optical isolator 723, a variable attenuator 760, an optical isolator 724, an optical coupler 714, the Bi type EDF 730, an optical coupler 715, an optical isolator 722, and an optical coupler 712. The optical amplification apparatus 700 also comprises a light-receiving device 752 (PD) connected to the optical coupler 712, a pumping light source 753 (LD) connected to the optical coupler 713, a pumping light source 754 connected to the optical coupler 714, a pumping light source 755 connected to the optical coupler 715, a temperature detecting device 461 (thermistor) disposed in contact with or in the vicinity of the Bi type EDF 730, and a control unit 790 for regulating operations of the optical amplification apparatus 700 as a whole. The control unit 790 comprises a variable ATT control circuit 791 for feedback-controlling the variable attenuator 760 according to the detected information from the temperature detecting device 761, and a memory 792 for storing actually measured data beforehand for enabling faster feedback control.

In the optical amplification apparatus 700 according to the seventh embodiment, the control unit 790 causes the variable attenuator 760 to increase and decrease the optical attenuation amount when the temperature of the Er-doped Bi type EDF 730 rises and drops, respectively. Faster control is possible if the actually measured data are stored in the memory 792.

Though the gain fluctuation of the optical amplification apparatus and the temperature fluctuation of the Er-doped Bi EDF are handled separately from each other in the above-mentioned control, they may fluctuate together in an actual optical communications system. If both fluctuations are to be compensated for by a variable attenuator alone, the loss may become so large that the pumping efficiency and noise figure deteriorate. If the fluctuations are to be compensated for by the temperature of the Er-doped Bi type EDF alone, on the other hand, the temperature range changeable by a Peltier device or heater is limited. In practice, as in the optical amplification apparatus 800 according to an eighth embodiment shown in FIG. 18, the temperature control of the Er-doped Bi type EDF 830 and the optical attenuation control of the variable attenuator 860 seem to be used together more often. The optical amplification apparatus 800 according to the eighth embodiment may carry out control such that, while keeping an optimal relationship between the actual gain fluctuation amount ΔG, the loss fluctuation amount ΔA of the variable attenuator 860, and the temperature fluctuation amount ΔT, ΔA or ΔA and ΔT are computed.

Figure 18:
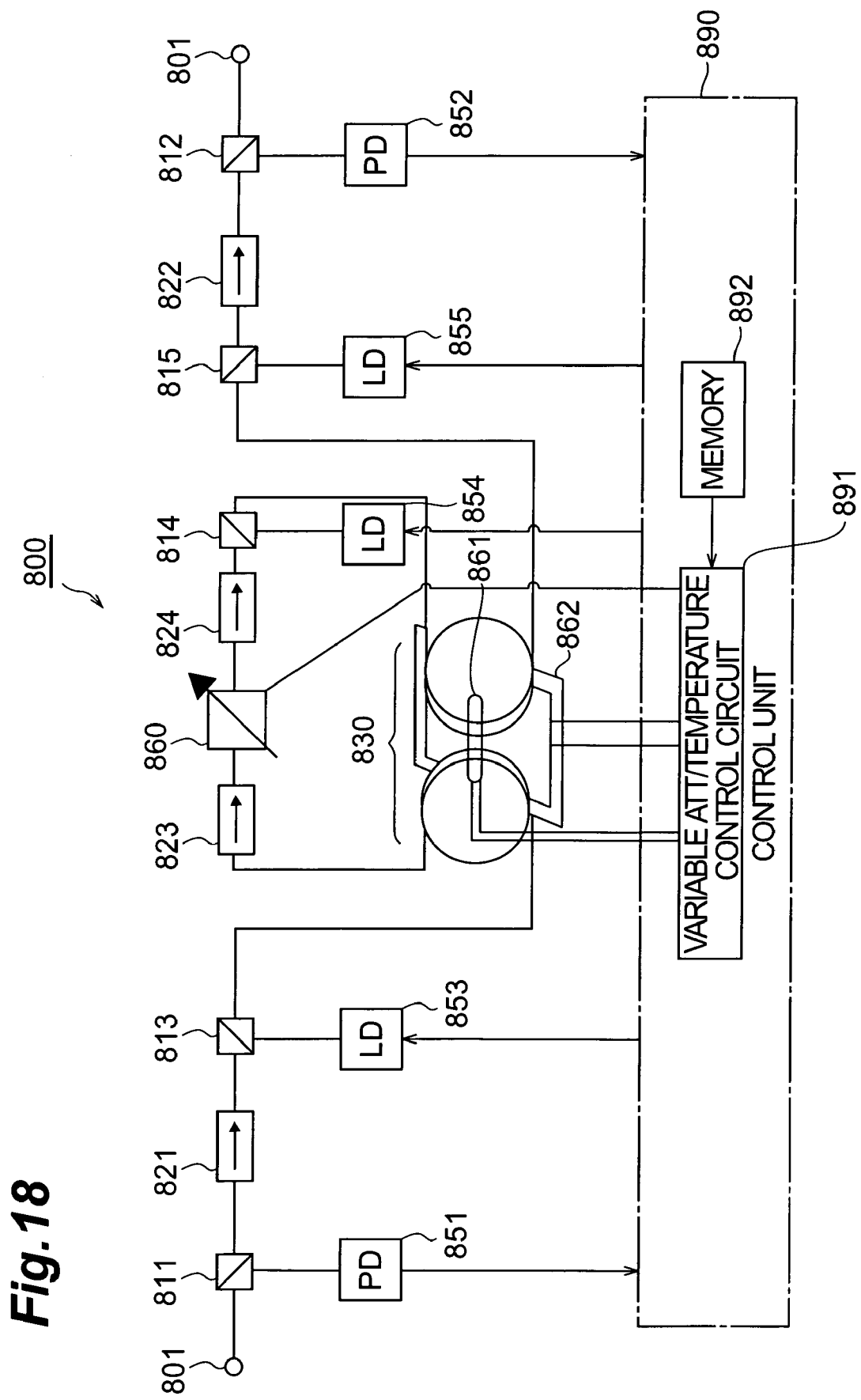
FIG. 18 is a diagram showing the configuration of an eighth embodiment of the optical amplification apparatus according to the present invention.

FIG. 18 is a diagram showing the configuration of eighth embodiment of the optical amplification apparatus according to the present invention. The optical amplification apparatus 800 shown in this diagram comprises, successively from its input end 801 to output end 802, an optical coupler 811, an optical isolator 821, an optical coupler 813, a Bi type EDF 830, an optical isolator 823, a variable attenuator 860, an optical isolator 824, an optical coupler 814, the Bi type EDF 830, an optical coupler 815, an optical isolator 822, and an optical coupler 812. The optical amplification apparatus 800 also comprises a light-receiving device 851 (PD) connected to the optical coupler 811, a light-receiving device 852 (PD) connected to the optical coupler 812, a pumping light source 853 (LD) connected to the optical coupler 813, a pumping light source 854 connected to the optical coupler 814, a pumping light source 855 connected to the optical coupler 815, a temperature-detecting device 861 (thermistor) and a temperature adjusting device 862 (Peltier device) which are disposed in contact with or in the vicinity of the Bi type EDF 830, and a control unit 890 for regulating operations of the optical amplification apparatus 800 as a whole. The control unit 890 comprises a variable ATT/temperature control circuit 891 for feedback-controlling the temperature adjusting device 862 according to the detected information from the temperature detecting device 861 and feedback-controlling the variable attenuator 860, and a memory 892 for storing actually measured data beforehand for enabling faster feedback control.

For maintaining the gain flatness at a high accuracy of ±1 dB, the control unit regulates the variable optical attenuator according to the temperature change ΔT (K) such that the optical attenuation amount ΔA (dB) in the variable optical attenuator satisfies the following relationship:

$$-0.0036 \cdot G_{min} \cdot \Delta T - 1.2 \leq \Delta A \leq -0.0036 \cdot G_{min} \cdot \Delta T + 1.2$$

where $G_{min}$ (dB) is the minimum value of actual gain within the signal wavelength band at 25° C. in the Bi type optical waveguide alone in the optical amplification module.

The control unit may regulate the variable optical attenuator according to the actual gain change amount ΔG (dB) in the optical amplification module and the temperature change ΔT (K) such that the optical attenuation amount ΔA (dB) in the variable optical attenuator satisfies the following relationship:

$$-0.0036 \cdot G_{min} \cdot \Delta T - \Delta G - 1.2 \leq \Delta A \leq -0.0036 \cdot G_{min} \cdot \Delta T - \Delta G + 1.2$$

where $G_{min}$ (dB) is the minimum value of actual gain within the signal wavelength band at 25° C. in the Bi type optical waveguide alone in the optical amplification module. If the actually measured data are stored in the memory 892, faster control is possible in the eighth embodiment as well.

Figure 19A:
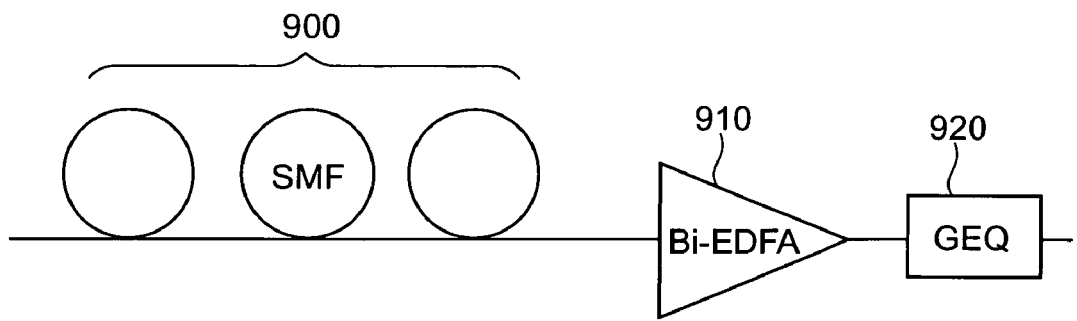
FIGS. 19A and 19B are diagrams showing respective configurations of a second embodiment and a comparative example of the optical communications system according to the present invention.

As mentioned above, the noise figure of a Bi type EDF for expanded L band does not always reach its quantum limit. It is therefore preferable to improve the noise figure more by combining a Raman amplifier with each of the optical amplification apparatus according to the embodiments. For verifying this fact, optical communications systems having respective configurations shown in FIGS. 19A and 19B were prepared. The optical communications system shown in FIG. 19A is constituted by a transmission line fiber 900 (SMF: Single-Mode Fiber) having a length of 80 km, an optical amplification apparatus (Bi-EDFA) 910 including a Bi type EDF according to the present invention, and a gain equalizer 920. As with the optical communications system of FIG. 19A, the optical communications system shown in FIG. 19B (a second embodiment of the optical communications system according to the present invention) comprises an SMF 900 having a length of 80 km, a Bi-EDFA 910, and a gain equalizer 920, and further comprises a pumping light supply system 940 for supplying a plurality of channels of pumping light to the SMF 900 by way of an optical coupler 930, thereby constituting a distribution Raman amplifier on the upstream side of the Bi-EDFA. In the optical communications system of FIG. 19B, the pumping light supply system 940 comprises a light source 942a for outputting light having a wavelength of 1468 nm and an output of 166 mW as a pumping channel, a light source 942b for outputting light having a wavelength of 1472 nm and an output of 269 mW as a pumping channel, a light source 942c for outputting light having a wavelength of 1520 nm and an output of 75 mW as a pumping channel, a light source 942d for outputting light having a wavelength of 1524 nm and an output of 210 mW as a pumping channel, and a multiplexer 941 for combining the respective pumping channels outputted from the light sources 942a to 942d.

Figure 20A:
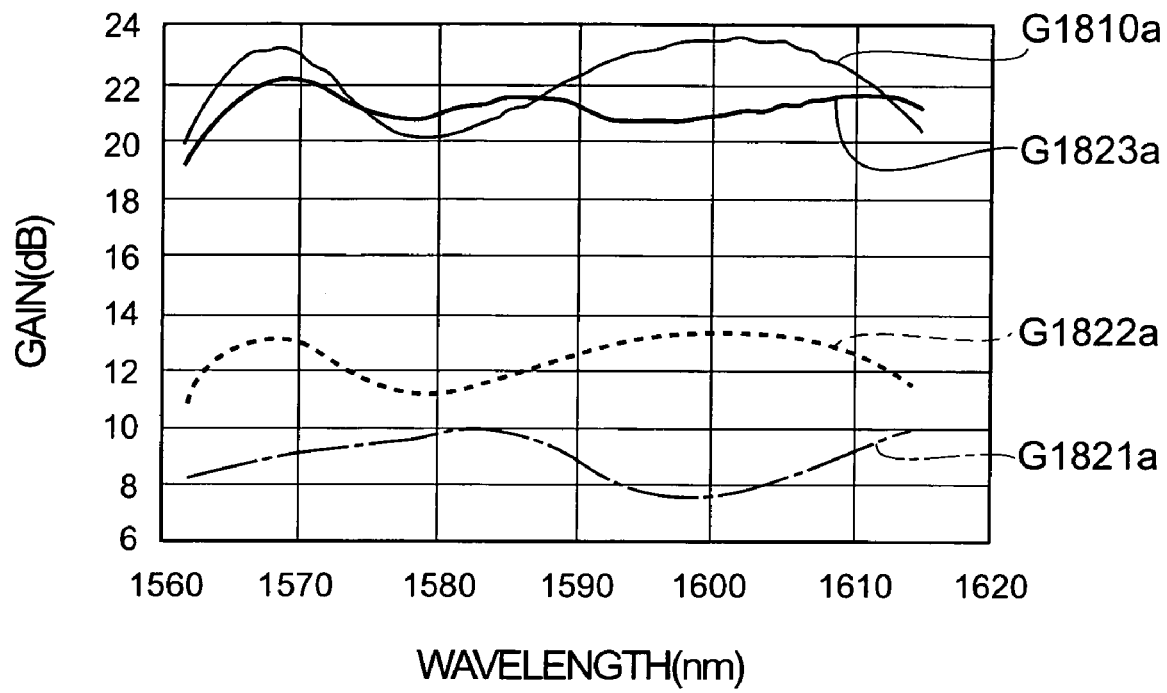
FIGS. 20A and 20B are graphs showing relationships between signal light wavelength and gain and relationships between signal light wavelength and noise figure in the optical communications systems shown in FIGS. 19A and 19B.
Figure 20B:
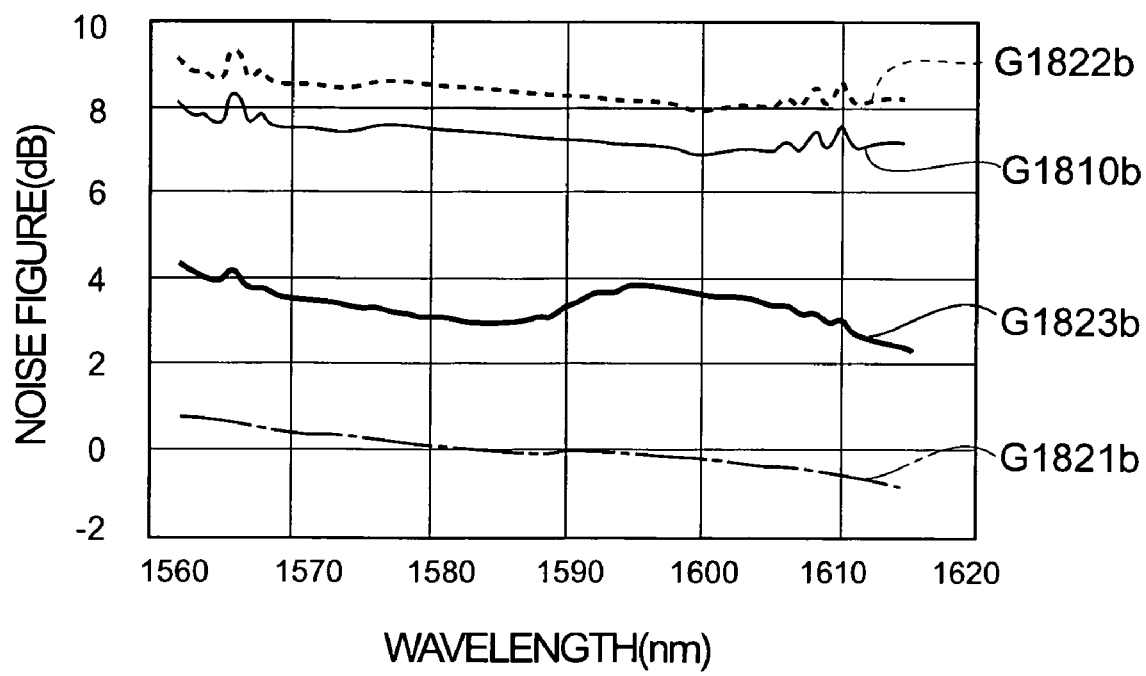

FIG. 20A is a graph showing a relationship between signal light wavelength and gain, whereas FIG. 20B is a graph showing a relationship between signal light wavelength and noise figure (NF).

Figure 19B:
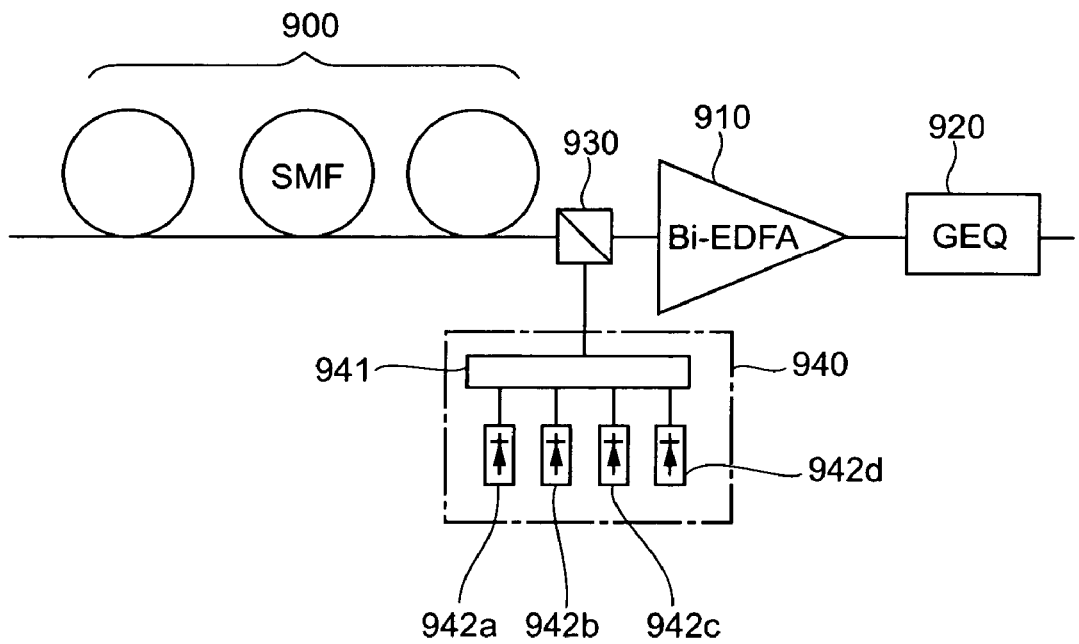

In FIG. 20A, curves G1810a, G1821a, G1822a, and G1823a indicate the gain spectrum of the Bi-EDFA in the optical communications system shown in FIG. 19A, the ON/OFF gain of the distribution type Raman amplifier in the optical communications system shown in FIG. 19B, the gain spectrum of the Bi-EDFA alone in the optical communications system shown in FIG. 19B, and the total gain of the optical communications system shown in FIG. 19B, respectively. In FIG. 20B, curves G1810b, G1821b, G1822b, and G1823b indicate the gain spectrum of the Bi-EDFA in the optical communications system shown in FIG. 19B, the ON/OFF gain of the distribution type Raman amplifier in the optical communications system shown in FIG. 19B, the gain spectrum of the Bi-EDFA alone in the optical communications system shown in FIG. 19B, and the total gain of the optical communications system shown in FIG. 19B, respectively.

While the expanded L-band EDFA alone exhibits a noise figure reaching 8 dB in the signal wavelength band of 1563 nm to 1615 nm in the optical communications system of FIG. 19A, the optical communications system (including the distribution type Raman amplifier) of FIG. 19B exhibits an effective noise figure of 4 dB or less. The gain non-uniformity reaches 3 dB in the optical communications system of FIG. 19A but is improved to 2 dB in the optical communications system of FIG. 19B. As such, utilizing not only the optical amplification apparatus but also the optical fiber transmission line positioned on the upstream side of the optical amplification apparatus as a Raman amplification optical fiber can improve the noise figure.

As in the foregoing, the present invention utilizes a Bi type optical waveguide as an optical amplification medium, thereby being practical without problems of thermal damages and toxicity, and making it possible to realize a gain spectrum having a smaller relative gain non-uniformity in a wider band of effective signal wavelength region included in L band.

What is claimed is:

1. An optical amplification module for collectively amplifying signal light having multiplexed a plurality of channels in a single wavelength band including a wavelength region having a wavelength of 1610 nm or longer, said optical amplification module comprising:
   a Bi oxide based optical waveguide, comprised of Bi oxide based host glass, including an optical waveguide region doped with Er element, for propagating the signal light;
   a pumping light supply system for supplying the optical waveguide region with pumping light so as to generate a population inversion within the optical waveguide region of said Bi oxide based optical waveguide; and
   a control unit for adjusting an optical power of the pumping light supplied from said pumping light supply system to said Bi oxide based optical waveguide so as to yield a relative gain non-uniformity of less than 25% in a net gain spectrum of said Bi oxide based optical waveguide at a predetermined operating temperature within an operating temperature range of said optical amplification module.

2. An optical amplification module according to claim 1, wherein the optical waveguide region doped with Er element is further doped with B element.

3. An optical amplification module according to claim 1, wherein the relative gain non-uniformity is less than 19%.

4. An optical amplification module for collectively amplifying signal light having multiplexed a plurality of channels in a single wavelength band including a wavelength region having a wavelength of 1610 nm or longer, said optical amplification module comprising:
   a Bi oxide based optical waveguide, comprised of Bi oxide based host glass, including an optical waveguide region doped with Er element, for propagating the signal light;
   a pumping light supply system for supplying the optical waveguide region with pumping light so as to generate a population inversion within the optical waveguide region of said Bi oxide based optical waveguide; and
   a control unit for adjusting an optical power of the pumping light supplied from said pumping light supply system to said Bi oxide based optical waveguide so as to yield a relative gain non-uniformity of less than 25% in a net gain spectrum of said Bi oxide based optical waveguide within a whole operating temperature range of said optical amplification module.

5. An optical amplification module according to claim 4, wherein the relative gain non-uniformity is less than 19%.

6. An optical amplification module for collectively amplifying signal light having multiplexed a plurality of channels in a single wavelength band including a wavelength region having a wavelength of 1610 nm or longer, said optical amplification module comprising:
   a Bi oxide based optical waveguide, comprised of Bi oxide based host glass, including an optical waveguide region doped with Er element, for propagating the signal light;
   a pumping light supply system for supplying the optical waveguide region with pumping light so as to generate a population inversion within the optical waveguide region of said Bi oxide based optical waveguide; and
   a control unit for adjusting an optical power of the pumping light supplied from said pumping light supply system to said Bi oxide based optical waveguide so as to yield a relative gain non-uniformity of less than 25% in a net gain spectrum of said Bi oxide based optical waveguide in a wavelength bandwidth exceeding 37 nm within a whole operating temperature range of said optical amplification module.

7. An optical amplification module according to claim 6, wherein the wavelength bandwidth exceeds 50 nm.

8. An optical amplification module for collectively amplifying signal light having multiplexed a plurality of channels in a single wavelength band including a wavelength region having a wavelength of 1610 nm or longer, said optical amplification module comprising:
   a Bi oxide based optical waveguide, comprised of Bi oxide based host glass, including an optical waveguide region doped with Er element, for propagating the signal light;
   a pumping light supply system for supplying the optical waveguide region with pumping light so as to generate a population inversion within the optical waveguide region of said Bi oxide based optical waveguide; and
   a control unit for adjusting an optical power of the pumping light supplied from said pumping light supply system to said Bi oxide based optical waveguide so as to yield a relative gain non-uniformity of less than 19% in a net gain spectrum of said Bi oxide based optical waveguide in a wavelength bandwidth exceeding 37 nm within a whole operating temperature range of said optical amplification module.

9. An optical amplification module according to claim 8, wherein the wavelength bandwidth exceeds 50 nm.

10. An optical amplification module for collectively amplifying signal light having multiplexed a plurality of channels in a single wavelength band including a wavelength region having a wavelength of 1610 nm or longer, said optical amplification module comprising:
    a Bi oxide based optical waveguide, comprised of Bi oxide based host glass, including an optical waveguide region doped with Er element, for propagating the signal light;
    a pumping light supply system for supplying the optical waveguide region with pumping light so as to generate a population inversion within the optical waveguide region of said Bi oxide based optical waveguide; and
    a temperature detecting device for detecting a temperature of said Bi oxide based optical waveguide or nearby.

11. An optical amplification module for collectively amplifying signal light having multiplexed a plurality of channels in a single wavelength band including a wavelength region having a wavelength of 1610 nm or longer, said optical amplification module comprising:
    a Bi oxide based optical waveguide, comprised of Bi oxide based host glass, including an optical waveguide region doped with Er element, for propagating the signal light;
    a pumping light supply system for supplying the optical waveguide region with pumping light so as to generate a population inversion within the optical waveguide region of said Bi oxide based optical waveguide; and
    a temperature adjusting device for adjusting a temperature of said Bi oxide based optical waveguide or nearby.

12. An optical amplification apparatus comprising: an optical amplification module according to claim 11; and
    a control unit for changing the temperature of said Bi type optical waveguide or nearby in said optical amplification module by $\Delta T$ (K) according to an actual gain change amount $\Delta G$ (dB) in said optical amplification module.

13. An optical amplification apparatus according to claim 12, wherein said control unit regulates the ΔT (K) so as to satisfy the following relationship:

$$(\Delta T \cdot G_{min}) \times 0.0036 - 1.2 \leq \Delta G \leq (\Delta T \cdot G_{min}) \times 0.0036 + 1.2$$

where $G_{min}$ (dB) is the minimum value of actual gain within the signal wavelength band at 25° C. in said Bi type optical waveguide alone.

14. An optical amplification apparatus according to claim 12, wherein said control unit comprises a memory having stored therein data of ΔG (dB) and ΔT (K) actually measured during an actual operation of said optical amplification apparatus.

15. An optical amplification apparatus comprising: an optical amplification module according to claim 11; and
a control unit for changing the temperature of said Bi type optical waveguide or nearby according to a detected gain tilt.

16. An optical amplification apparatus comprising:
an optical amplification module according to claim 11;
a variable attenuator, disposed on a transmission path of the signal light, having a variable loss characteristic with respect to the signal light; and
a control unit for ordering said Bi type optical waveguide of said optical amplification module to be heated and cooled when a detected gain tilt in said optical amplification module is positive and negative, respectively.

17. An optical amplification module according to claim 1, further comprising a light-losing component, disposed on a transmission path of the signal light, having a variable loss characteristic with respect to the signal light.

18. An optical amplification module according to claim 17, wherein said light-losing component includes a variable optical attenuator.

19. An optical amplification apparatus comprising: an optical amplification module according to claim 18; and
a control unit for determining an optical attenuation amount ΔA (dB) in said variable optical attenuator in said optical amplification module according to a detected temperature change ΔT (K) of said Bi type optical waveguide or nearby in said optical amplification module.

20. An optical amplification apparatus according to claim 12, further comprising a variable attenuator, disposed on a transmission path of the signal light, having a variable loss characteristic with respect to the signal light;
wherein said control unit regulates said variable attenuator such that an optical attenuation amount ΔA (dB) in said variable attenuator is in proportion to the detected temperature change ΔT (K).

21. An optical amplification apparatus according to claim 12, further comprising a variable attenuator, disposed on a transmission path of the signal light, having a variable loss characteristic with respect to the signal light;
wherein said control unit regulates said variable attenuator according to the temperature change ΔT (K) such that the optical attenuation amount ΔA (dB) in said variable optical attenuator satisfies the following relationship:

$$-0.0036 \cdot G_{min} \cdot \Delta T - 1.2 \leq \Delta A \leq -0.0036 \cdot G_{min} \cdot \Delta T + 1.2$$

where $G_{min}$ (dB) is the minimum value of actual gain within the signal wavelength band at 25° C. in said Bi type optical waveguide alone in said optical amplification module.

22. An optical amplification apparatus according to claim 19, wherein said control unit regulates said variable optical attenuator according to the actual gain change amount ΔG (dB) in said optical amplification module and the temperature change ΔT (K) such that the optical attenuation amount ΔA (dB) in said variable optical attenuator satisfies the following relationship:

$$-0.0036 \cdot G_{min} \cdot \Delta T - \Delta G - 1.2 \leq \Delta A \leq -0.0036 \cdot G_{min} \cdot \Delta T - \Delta G + 1.2$$

where $G_{min}$ (dB) is the minimum value of actual gain within the signal wavelength band at 25° C. in said Bi type optical waveguide alone in said optical amplification module.

23. An optical amplification apparatus according to claim 19, wherein said control unit comprises a memory having stored therein data of actual gain change amount ΔG (dB) and temperature change ΔT (K) in said optical amplification module actually measured during an actual operation of said optical amplification apparatus.

24. An optical amplification apparatus according to claim 19, wherein said control unit comprises a memory having stored therein data of actual gain change amount ΔG (dB) and temperature change ΔT (K) in said optical amplification module and optical attenuation amount ΔA (dB) in said variable optical attenuator actually measured during an actual operation of said optical amplification apparatus.

25. An optical amplification apparatus comprising:
an optical amplification module according to claim 18; and
a control unit for changing an optical attenuation amount ΔA (dB) of said variable optical attenuator according to a detected gain tilt in said optical amplification module.

26. An optical amplification apparatus comprising:
an optical amplification module according to claim 11 including a variable attenuator, disposed on a transmission path of the signal light, having a variable loss characteristic with respect to the signal light; and
a control unit for ordering said Bi type optical waveguide of said optical amplification module to increase and decrease an optical attenuation amount ΔA (dB) of said variable optical attenuator when a detected gain tilt in the optical amplification module is positive and negative, respectively.

27. An optical amplification module according to claim 1, satisfying the following relationship:

$$\alpha_B \leq 0.021 \alpha$$

where $\alpha_B$ (dB/m) is the background loss of said Bi oxide based optical waveguide, and α (dB/m) is the absorption peak due to Er.

28. An optical amplification module according to claim 1, satisfying the following relationship:

$$\alpha_B \leq 0.015 \alpha$$

where $\alpha_B$ (dB/m) is the background loss of said Bi oxide based optical waveguide, and α (dB/m) is the absorption peak due to Er.

29. An optical amplification module according to claim 1, wherein said Bi oxide based optical waveguide includes an optical fiber.

30. An optical amplification module according to claim 1, wherein said pumping light supply system includes a light source having a center output wavelength falling within the range from 1453 nm to 1473 nm at the highest output.

31. An optical amplification module according to claim 1, wherein said pumping light supply system includes a light source always having a center output wavelength falling within the range from 1453 nm to 1473 nm.

32. An optical amplification module according to claim 1, wherein said pumping light supply system comprises:
   a semiconductor light-emitting device including a light-reflecting surface and a light-emitting surface opposing the light-reflecting surface; and
   a grating for reflecting a part of light having a specific wavelength in light emitted from the light-emitting surface of said semiconductor light-emitting device, and making thus emitted light incident on the inside of said semiconductor light-emitting device from the light-emitting surface.

33. An optical amplification module according to claim 32, wherein said grating includes an optical fiber grating formed on an optical fiber.

34. An optical amplification module according to claim 1, further comprising a silica-based optical waveguide comprised of silica-based host glass including an optical waveguide region which is doped with Er element and through which the signal light propagates.

35. An optical amplification module according to claim 34, wherein said silica-based optical waveguide is disposed on a transmission path of the signal light so as to be located on the upstream side of said Bi type optical waveguide as seen in a traveling direction of the signal light.

36. An optical amplification module according to claim 34, wherein said silica-based optical waveguide is disposed on a transmission path of the signal light so as to be located on the downstream side of said Bi type optical waveguide as seen in a traveling direction of the signal light.

37. An optical amplification module according to claim 34, wherein the optical waveguide region of said silica-based optical waveguide is codoped with P element and at least one of Al and La elements.

38. An optical amplification apparatus comprising an optical amplification module according to claim 1, said optical amplification module amplifying signal light having multiplexed a plurality of channels included in L band.

39. An optical amplification apparatus according to claim 38, further comprising a Raman amplification optical fiber disposed on a transmission path of the signal light so as to be located on the upstream side of said Bi type optical waveguide as seen in a traveling direction of the signal light.

40. An optical amplification apparatus according to claim 38, further comprising a Raman amplification optical fiber disposed on a transmission path of the signal light as to be located on the upstream side of said Bi oxide based optical waveguide as seen in a traveling direction of the signal light, wherein said Raman amplification optical fiber is supplied with at least one of pumping light near a wavelength of 1470 nm and pumping light having a wavelength of 1520 nm or more.

41. An optical communications system comprising the optical amplification apparatus according to claim 38, said optical communications system transmitting signal light having multiplexed a plurality of channels included in L band, said optical amplification apparatus amplifying the signal light.

42. An optical communications system according to claim 41, further comprising a Raman amplification optical fiber disposed on a transmission path of the signal light so as to be located on the upstream side of said optical amplification apparatus as seen in a traveling direction of the signal light.

43. An optical communications system according to claim 42, wherein said Raman amplification optical fiber is supplied with at least one of pumping light near a wavelength of 1470 nm and pumping light having a wavelength of 1520 nm or more.

44. An optical amplification module according to claim 4, wherein the optical waveguide region doped with Er element is further doped with B element.

45. An optical amplification module according to claim 4, satisfying the following relationship:

$$\alpha_B \leq 0.021\alpha$$

where $\alpha_B$ (dB/m) is the background loss of said Bi oxide based optical waveguide, and $\alpha$ (dB/m) is the absorption peak due to Er.

46. An optical amplification module according to claim 4, satisfying the following relationship:

$$\alpha_B \leq 0.015\alpha$$

where $\alpha_B$ (dB/m) is the background loss of said Bi oxide based optical waveguide, and $\alpha$ (dB/m) is the absorption peak due to Er.

47. An optical amplification module according to claim 4, wherein said Bi oxide based optical waveguide includes an optical fiber.

48. An optical amplification module according to claim 4, wherein said pumping light supply system includes a light source having a center output wavelength falling within the range from 1453 nm to 1473 nm at the highest output.

49. An optical amplification module according to claim 4, wherein said pumping light supply system includes a light source having a center output wavelength falling within the range from 1453 nm to 1473 nm.

50. An optical amplification module according to claim 4, wherein said pumping light supply system comprises:
   a semiconductor light-emitting device including a light-reflecting surface and a light-emitting surface opposing the light-reflecting surface; and
   a grating for reflecting a part of light having a specific wavelength in light emitted from the light-emitting surface of said semiconductor light-emitting device, and making thus emitted light incident on the inside of said semiconductor light-emitting device form the light-emitting surface.

51. An optical amplification module according to claim 6, wherein the optical waveguide region doped with Er element is further doped with B element.

52. An optical amplification module according to claim 6, satisfying the following relationship:

$$\alpha_B \leq 0.021\alpha$$

where $\alpha_B$ (dB/m) is the background loss of said Bi oxide based optical waveguide, and $\alpha$ (dB/m) is the absorption peak due to Er.

53. An optical amplification module according to claim 6, satisfying the following relationship:

$$\alpha_B \leq 0.015\alpha$$

where $\alpha_B$ (dB/m) is the background loss of said Bi oxide based optical waveguide, and $\alpha$ (dB/m) is the absorption peak due to Er.

54. An optical amplification module according to claim 6, wherein said Bi oxide based optical waveguide includes an optical fiber.

55. An optical amplification module according to claim 6, wherein said pumping light supply system includes a light source having a center output wavelength falling within the range from 1453 nm to 1473 nm at the highest output.

56. An optical amplification module according to claim 6, wherein said pumping light supply system includes a light source having a center output wavelength falling within the range from 1453 nm to 1473 nm.

57. An optical amplification module according to claim 6, wherein said pumping light supply system comprises:
  a semiconductor light-emitting device including a light-reflecting surface and a light-emitting surface opposing the light-reflecting surface; and
  a grating for reflecting a part of light having a specific wavelength in light emitted from the light-emitting surface of said semiconductor light-emitting device, and making thus emitted light incident on the inside of said semiconductor light-emitting device form the light-emitting surface.

58. An optical amplification module according to claim 8, wherein the optical waveguide region doped with Er element is further doped with B element.

59. An optical amplification module according to claim 8, satisfying the following relationship:

$\alpha_B \leq 0.021\alpha$ where $\alpha_B$ (dB/m) is the background loss of said Bi oxide based optical waveguide, and $\alpha$ (dB/m) is the absorption peak due to Er.

60. An optical amplification module according to claim 8, satisfying the following relationship:

$\alpha_B \leq 0.015\alpha$ where $\alpha_B$ (dB/m) is the background loss of said Bi oxide based optical waveguide, and $\alpha$ (dB/m) is the absorption peak due to Er.

61. An optical amplification module according to claim 8, wherein said Bi oxide based optical waveguide includes an optical fiber.

62. An optical amplification module according to claim 8, wherein said pumping light supply system includes a light source having a center output wavelength falling within the range from 1453 nm to 1473 nm at the highest output.

63. An optical amplification module according to claim 8, wherein said pumping light supply system includes a light source having a center output wavelength falling within the range from 1453 nm to 1473 nm.

64. An optical amplification module according to claim 8, wherein said pumping light supply system comprises:
  a semiconductor light-emitting device including a light-reflecting surface and a light-emitting surface opposing the light-reflecting surface; and
  a grating for reflecting a part of light having a specific wavelength in light emitted from the light-emitting surface of said semiconductor light-emitting device, and making thus emitted light incident on the inside of said semiconductor light-emitting device form the light-emitting surface.

65. An optical amplification module according to claim 10, wherein the optical waveguide region doped with Er element is further doped with B element.

66. An optical amplification module according to claim 10, satisfying the following relationship:

$\alpha_B \leq 0.021\alpha$ where $\alpha_B$ (dB/m) is the background loss of said Bi oxide based optical waveguide, and $\alpha$ (dB/m) is the absorption peak due to Er.

67. An optical amplification module according to claim 10, satisfying the following relationship:

$\alpha_B \leq 0.015\alpha$ where $\alpha_B$ (dB/m) is the background loss of said Bi oxide based optical waveguide, and $\alpha$ (dB/m) is the absorption peak due to Er.

68. An optical amplification module according to claim 10, wherein said Bi oxide based optical waveguide includes an optical fiber.

69. An optical amplification module according to claim 10, wherein said pumping light supply system includes a light source having a center output wavelength falling within the range from 1453 nm to 1473 nm at the highest output.

70. An optical amplification module according to claim 10, wherein said pumping light supply system includes a light source having a center output wavelength falling within the range from 1453 nm to 1473 nm.

71. An optical amplification module according to claim 10, wherein said pumping light supply system comprises:
  a semiconductor light-emitting device including a light-reflecting surface and a light-emitting surface opposing the light-reflecting surface; and
  a grating for reflecting a part of light having a specific wavelength in light emitted from the light-emitting surface of said semiconductor light-emitting device, and making thus emitted light incident on the inside of said semiconductor light-emitting device form the light-emitting surface.

72. An optical amplification module according to claim 11, wherein the optical waveguide region doped with Er element is further doped with B element.

73. An optical amplification module according to claim 11, satisfying the following relationship:

$\alpha_B \leq 0.021\alpha$ where $\alpha_B$ (dB/m) is the background loss of said Bi oxide based optical waveguide, and $\alpha$ (dB/m) is the absorption peak due to Er.

74. An optical amplification module according to claim 11, satisfying the following relationship:

$\alpha_B \leq 0.015\alpha$ where $\alpha_B$ (dB/m) is the background loss of said Bi oxide based optical waveguide, and $\alpha$ (dB/m) is the absorption peak due to Er.

75. An optical amplification module according to claim 11, wherein said Bi oxide based optical waveguide includes an optical fiber.

76. An optical amplification module according to claim 11, wherein said pumping light supply system includes a light source having a center output wavelength falling within the range from 1453 nm to 1473 nm at the highest output.

77. An optical amplification module according to claim 11, wherein said pumping light supply system includes a light source having a center output wavelength falling within the range from 1453 nm to 1473 nm.

78. An optical amplification module according to claim 11, wherein said pumping light supply system comprises:
  a semiconductor light-emitting device including a light-reflecting surface and a light-emitting surface opposing the light-reflecting surface; and
  a grating for reflecting a part of light having a specific wavelength in light emitted from the light-emitting surface of said semiconductor light-emitting device, and making thus emitted light incident on the inside of said semiconductor light-emitting device form the light-emitting surface.

* * * * *